United States Patent
Nam et al.

(10) Patent No.: US 11,974,282 B2
(45) Date of Patent: Apr. 30, 2024

(54) CONTROL SIGNALING FOR SUPPORTING MULTIPLE SERVICES IN ADVANCED COMMUNICATION SYSTEMS

(71) Applicant: Samsung Electronics Co., Ltd., Suwon-si (KR)

(72) Inventors: Young-Han Nam, Plano, TX (US); Sudhir Ramakrishna, Plano, TX (US); Li Guo, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 16/730,817

(22) Filed: Dec. 30, 2019

(65) Prior Publication Data

US 2020/0137751 A1 Apr. 30, 2020

Related U.S. Application Data

(63) Continuation of application No. 15/449,840, filed on Mar. 3, 2017, now Pat. No. 10,524,237.

(Continued)

(51) Int. Cl.
*H04W 72/21* (2023.01)
*H04L 5/00* (2006.01)
(Continued)

(52) U.S. Cl.
CPC ............. *H04W 72/21* (2023.01); *H04L 5/00* (2013.01); *H04L 5/0053* (2013.01);
(Continued)

(58) Field of Classification Search
CPC .......... H04W 72/0413; H04W 74/006; H04W 72/042; H04W 72/0446; H04W 72/0453;
(Continued)

(56) References Cited

U.S. PATENT DOCUMENTS 10,142,962 B2 11/2018 Lee et al.
2005/0181811 A1* 8/2005 Magnusson ........... H04W 52/50
455/458

(Continued)

FOREIGN PATENT DOCUMENTS

CN 101610491 A 12/2009
CN 102726109 A 10/2012
(Continued)

OTHER PUBLICATIONS

Office Action dated Oct. 29, 2020 in connection with Chinese Patent Application No. 201780014877.8, 15 pages.
(Continued)

*Primary Examiner* — Brenda H Pham

(57) ABSTRACT

A method of user equipment (UE) in a wireless communication system. The method comprises receiving, from a base station (BS), a downlink signal including position information for orthogonal frequency division multiplexing (OFDM) symbols of a short physical uplink control channel (PUCCH), determining, based on the position information, a position of the OFDM symbols of the short PUCCH included in a slot, and transmitting, to the BS, the short PUCCH using the OFDM symbols based on the determined position.

20 Claims, 25 Drawing Sheets

Related U.S. Application Data

(60) Provisional application No. 62/306,415, filed on Mar. 10, 2016, provisional application No. 62/304,708, filed on Mar. 7, 2016.

(51) Int. Cl.
  *H04L 27/26* (2006.01)
  *H04W 72/0446* (2023.01)
  *H04W 72/0453* (2023.01)
  *H04W 72/23* (2023.01)
  *H04W 74/00* (2009.01)
  *H04L 25/03* (2006.01)

(52) U.S. Cl.
  CPC ..... *H04L 27/2602* (2013.01); *H04W 72/0446* (2013.01); *H04W 72/0453* (2013.01); *H04W 72/23* (2023.01); *H04W 74/006* (2013.01); *H04L 5/0007* (2013.01); *H04L 2025/03796* (2013.01); *H04L 27/26025* (2021.01)

(58) Field of Classification Search
  CPC ..... H04L 5/00; H04L 5/0053; H04L 27/2602; H04L 5/0007; H04L 2025/03796
  See application file for complete search history.

(56) References Cited

U.S. PATENT DOCUMENTS

| | | | |
|---|---|---|---|
| 2009/0103562 A1 | 4/2009 | Frederiksen et al. | |
| 2010/0272048 A1* | 10/2010 | Pan | H04L 1/1671 370/329 |
| 2011/0105136 A1 | 5/2011 | Choi | |
| 2012/0106491 A1* | 5/2012 | Yang | H04L 1/0073 370/329 |
| 2012/0287848 A1 | 11/2012 | Kim et al. | |
| 2013/0114575 A1* | 5/2013 | Fu | H04L 5/0053 370/336 |
| 2014/0050148 A1 | 2/2014 | Choi | |
| 2014/0056184 A1* | 2/2014 | Yang | H04L 1/1861 370/280 |
| 2015/0029990 A1 | 1/2015 | Marinier et al. | |
| 2015/0043392 A1 | 2/2015 | Susitaival et al. | |

FOREIGN PATENT DOCUMENTS

| | | |
|---|---|---|
| CN | 104704884 A | 6/2015 |
| EP | 2536203 A1 | 12/2012 |
| KR | 10-2014-0136923 A | 12/2014 |
| WO | 2013/168901 A1 | 11/2013 |

OTHER PUBLICATIONS

Korean Intellectual Property Office, "Notice of Preliminary Rejection" dated Apr. 2, 2021, in connection with Korean Patent Application No. KR 10-2018-7024977, 11 pages.

Korean Intellectual Property Office, "Notice of Preliminary Rejection" dated Jun. 10, 2021, in connection with Korean Patent Application No. KR 10-2018-7024977, 7 pages.

Ericsson, "Physical layer aspects of short PUCCH", 3GPP TSG RAN WG1 Meeting #84, R1-160936,Malta, Feb. 15-19, 2016, 4 pages.

Notice of Patent Grant dated Dec. 7, 2021, in connection with Korean Application No. 10-2018-7024977, 4 pages.

* cited by examiner

CONTROL SIGNALING FOR SUPPORTING MULTIPLE SERVICES IN ADVANCED COMMUNICATION SYSTEMS

CROSS-REFERENCE TO RELATED APPLICATIONS AND CLAIM OF PRIORITY

This application is a continuation of U.S. patent application Ser. No. 15/449,840, filed Mar. 3, 2017, which claims priority to U.S. Provisional Patent Application No. 62/304,708, filed Mar. 7, 2016, and U.S. Provisional Patent Application No. 62/306,415, filed Mar. 10, 2016. The contents of the above-identified patent documents are incorporated herein by reference.

TECHNICAL FIELD

The present application relates generally to advanced communication systems. More specifically, this disclosure relates to multiple services in advanced communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a user equipment (UE) in a wireless communication system is provided, the UE includes a transceiver configured to receive, from an eNodeB (eNB), a downlink signal including position information for orthogonal frequency division multiplexing (OFDM) symbols of a short physical uplink control channel (PUCCH) and at least one processor configured to identify, based on the position information, a position of the OFDM symbols of the short PUCCH included in a slot. The UE further includes the transceiver configured to transmitting, to the eNB, the short PUCCH using the OFDM symbols based on the identified position.

In another embodiment, the base station (BS) in a wireless communication system is provided. The BS includes at least one processor configured to identify position information including a position of OFDM symbols of a short physical uplink control channel (PUCCH) included in a slot and a transceiver configured to transmit, to a user equipment (UE), a downlink signal comprising the position information including the position of OFDM symbols of the PUCCH; and receive, from the UE, the short PUCCH using the OFDM symbols based on the identified position.

In yet another embodiment, a method of user equipment (UE) in a wireless communication system is provided. The method comprises receiving, from an eNodeB (eNB), a downlink signal including position information for orthogonal frequency division multiplexing (OFDM) symbols of a short physical uplink control channel (PUCCH), identifying, based on the position information, a position of the OFDM symbols of the short PUCCH included in a slot; and transmitting, to the eNB, the short PUCCH using the OFDM symbols based on the identified position.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates a frame structure with 5 BBSFs per frame and a value FrameComposition=0 according to embodiments of the present disclosure;

FIG. 12 illustrates a frame structure with 5 BBSFs per frame and a value FrameComposition=1 according to embodiments of the present disclosure;

DETAILED DESCRIPTION

FIGS. 1 through FIG. 29, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TR 22.891 v1.2.0, "Study on New Service and Markets Technology Enablers."

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access(NOMA), and sparse code multiple access (SCMA) as an advanced access technology have been developed.

Figure 1:
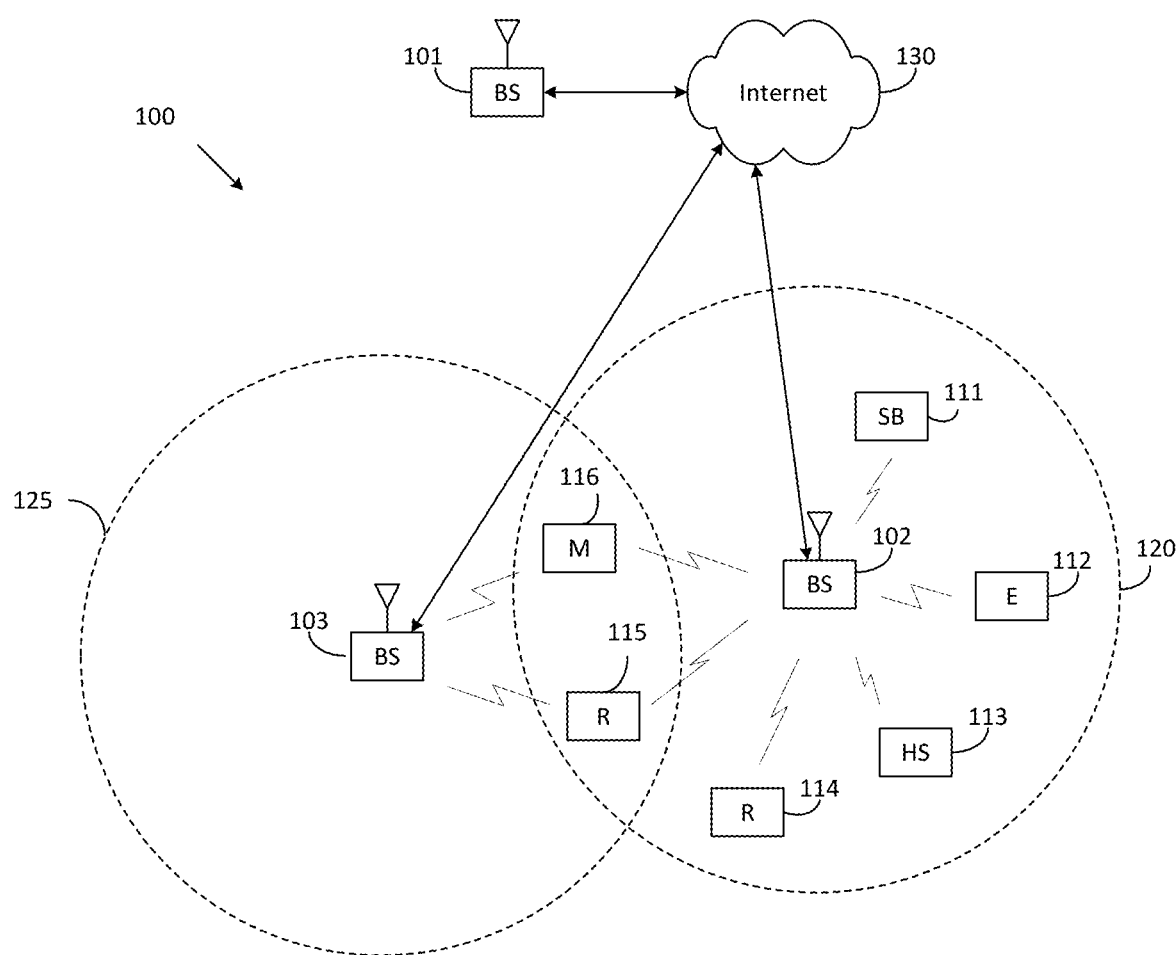
FIG. 1 illustrates an example wireless network according to embodiments of the present disclosure.
Figure 2:
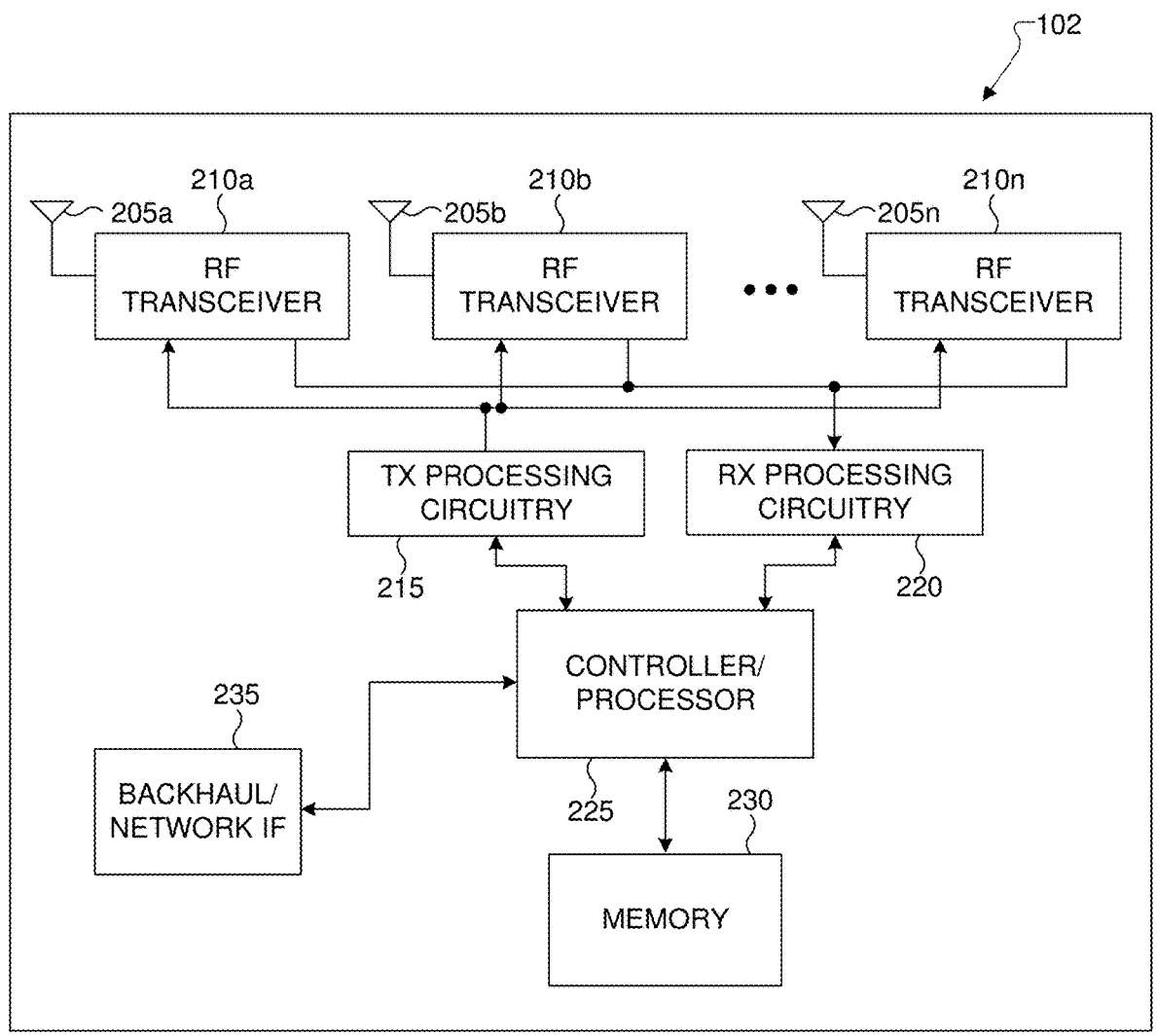
FIG. 2 illustrates an example eNB according to embodiments of the present disclosure.
Figure 3:
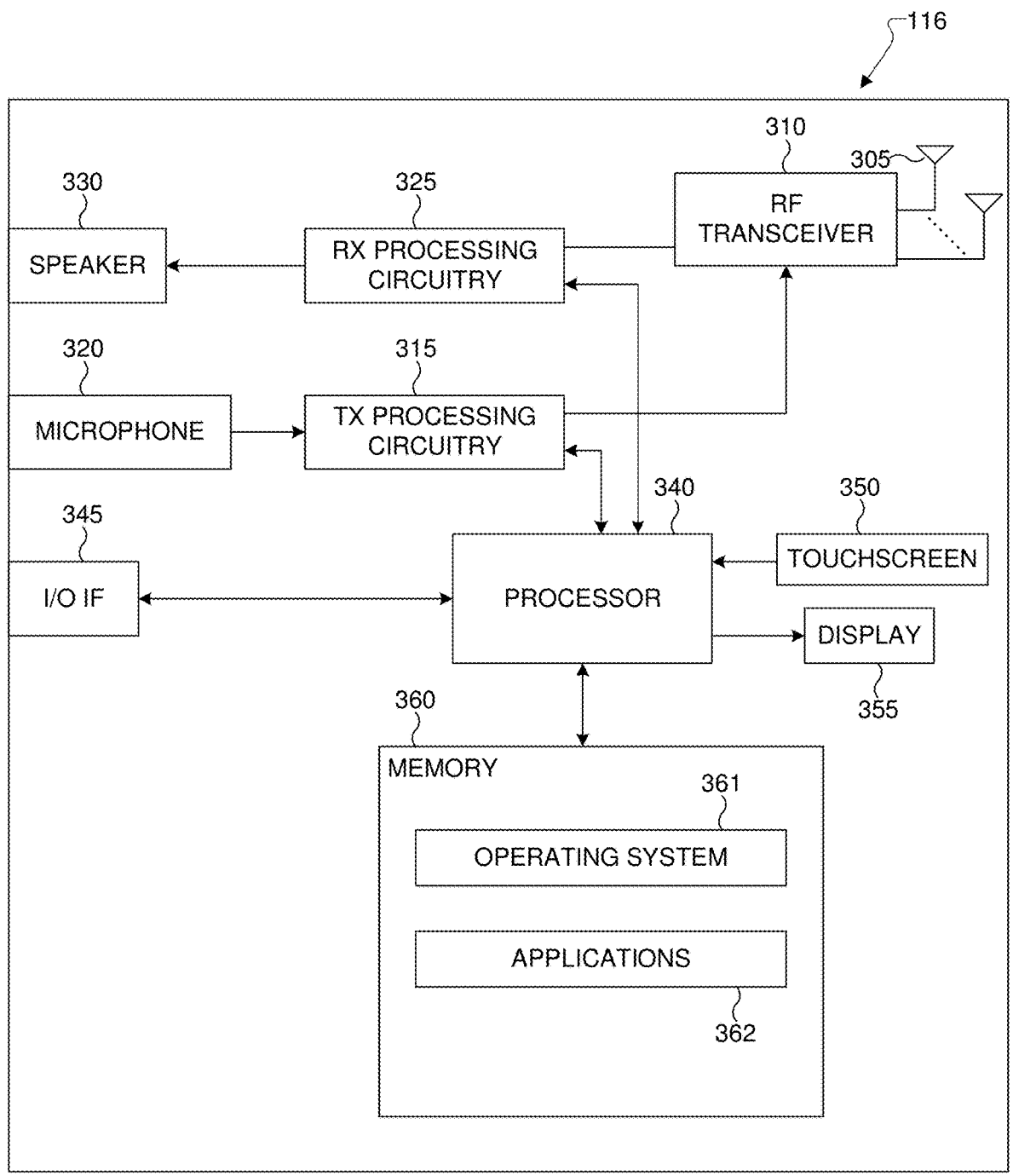
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 100 illustrates an example wireless network according to embodiments of the present disclosure. The embodiment of the wireless network shown in FIG. 1 100 is for illustration only. Other embodiments of the wireless network 100 could be used without departing from the scope of this disclosure.

As shown in FIG. 1 100, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient CSI reporting on PUCCH in an advanced wireless communication system. In certain embodiments, and one or more of the eNBs 101-103 includes circuitry, programing, or a combination thereof, for receiving efficient CSI reporting on PUCCH in an advanced wireless communication system.

Although FIG. 1 100 illustrates one example of a wireless network, various changes may be made to FIG. 1 100. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 200 illustrates an example eNB 102 according to embodiments of the present disclosure. The embodiment of the eNB 102 illustrated in FIG. 2 200 is for illustration only, and the eNBs 101 and 103 of FIG. 1 100 could have the same or similar configuration. However, eNBs come in a wide variety of configurations, and FIG. 2 200 does not limit the scope of this disclosure to any particular implementation of an eNB.

As shown in FIG. 2 200, the eNB 102 includes multiple antennas 205a-205n, multiple RF transceivers 210a-210n, transmit (TX) processing circuitry 215, and receive (RX)

processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is also capable of transmitting, to a user equipment (UE), a downlink signal comprising the position information including the position of OFDM symbols of the PUCCH and receiving, from the UE, the short PUCCH using the OFDM symbols based on the identified position.

In some embodiments, the RF transceiver 210a-201n is also capable of receiving the short PUCCH using the 1-th OFDM symbol based on the identified position, wherein the 1 is dynamically or semi-statically allocated by a higher layer signaling received from the eNB.

In some embodiments, the RF transceiver 210a-201n is also capable of receiving the short PUCCH using the number of OFDM symbols based on the identified position. In such embodiments, the number of OFDM symbols is dynamically or semi-statically allocated by a higher layer signaling transmitted to the UE, the number of OFDM symbols being determined by a positive integer number.

In some embodiments, the RF transceiver 210a-201n is also capable of transmitting a group common physical downlink control channel (PDCCH) including format information of the slot, wherein the format information comprises at least one of downlink duration, uplink duration, or blank duration.

In some embodiments, the RF transceiver 210a-201n is also capable of transmitting at least one control resource set including downlink control information that includes a plurality of subbands using higher layer signaling transmit to the UE.

In such embodiments, the at least one control resource set includes a set of physical resource blocks (PRBs) for blindly searching the downlink control information, the PRBs being contiguous or not contiguous in a frequency domain, the control resource set including at least one downlink control information (DCI) message.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

In some embodiments, the controller/processor 225 is capable of includes at least one microprocessor or microcontroller. As described in more detail below, the eNB 102 may include circuitry, programing, or a combination thereof for processing of CSI reporting on PUCCH. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of identifying position information including a position of OFDM symbols of a short physical uplink control channel (PUCCH) included in a slot.

In some embodiments, the controller/processor 225 is capable of identifying, based on the position information, the position of the OFDM symbols of the short PUCCH included in the slot that is located on an 1-th OFDM symbol from a last OFDM symbol of the slot, wherein the 1 is selected from a zero and a positive integer number.

In some embodiments, the controller/processor 225 is capable of identifying, based on the position information, the position of the OFDM symbols of the short PUCCH included in the slot, the short PUCCH spanning a number of OFDM symbols from a last OFDM symbol of the slot. In such embodiments, the number of OFDM symbols is dynamically or semi-statically allocated by a higher layer signaling transmitted to the UE, the number of OFDM symbols being determined by a positive integer number.

In some embodiments, the controller/processor 225 is capable of determining the OFDM symbols included in the slot based on the format information.

In some embodiments, the controller/processor 225 is capable of identifying the downlink control information included in each of the plurality of subbands, wherein each of the plurality of subbands comprises different control information for different data group. In such embodiments, the at least one control resource set includes a set of physical resource blocks (PRBs) for blindly searching the downlink control information, the PRBs being contiguous or not contiguous in a frequency domain, the control resource set including at least one downlink control information (DCI) message.

The memory 230 is coupled to the controller/processor 225. Part of the memory 230 could include a RAM, and another part of the memory 230 could include a Flash memory or other ROM.

Although FIG. 2 200 illustrates one example of eNB 102, various changes may be made to FIG. 2 200. For example, the eNB 102 could include any number of each component shown in FIG. 2 200. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 200 could be combined, further subdivided, or omitted and additional components could be added according to particular needs.

FIG. 3 300 illustrates an example UE 116 according to embodiments of the present disclosure. The embodiment of the UE 116 illustrated in FIG. 3 300 is for illustration only, and the UEs 111-115 of FIG. 1 100 could have the same or similar configuration. However, UEs come in a wide variety of configurations, and FIG. 3 300 does not limit the scope of this disclosure to any particular implementation of a UE.

As shown in FIG. 3 300, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving, from an eNodeB (eNB), a downlink signal including position information for orthogonal frequency division multiplexing (OFDM) symbols of a short physical uplink control channel (PUCCH); and transmitting, to the eNB, the short PUCCH using the OFDM symbols based on the identified position.

In some embodiments, the RF transceiver 310 is capable of transmitting the short PUCCH using the 1-th OFDM symbol based on the identified position, wherein the 1 is dynamically or semi-statically allocated by a higher layer signaling received from the eNB.

In some embodiments, the RF transceiver 310 is capable of transmitting the short PUCCH using the number of OFDM symbols based on the identified position. In such embodiments, the number of OFDM symbols is dynamically or semi-statically allocated by a higher layer signaling received from the eNB, the number of OFDM symbols being determined by a positive integer number.

In some embodiments, the RF transceiver 310 is capable of receiving a group common physical downlink control channel (PDCCH) including format information of the slot, wherein the format information comprises at least one of downlink duration, uplink duration, or blank duration.

In some embodiments, the RF transceiver 310 is capable of receiving at least one control resource set including downlink control information that includes a plurality of subbands using higher layer signaling received from the eNB. In such embodiments, the at least one control resource set includes a set of physical resource blocks (PRBs) for blindly searching the downlink control information, the PRBs being contiguous or not contiguous in a frequency domain, the control resource set including at least one downlink control information (DCI) message.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is also capable of identifying, based on the position information, a position of the OFDM symbols of the short PUCCH included in a slot.

In some embodiments, the processor 340 is also capable of identifying, based on the position information, the position of the OFDM symbols of the short PUCCH included in the slot that is located on an 1-th OFDM symbol from a last OFDM symbol of the slot, wherein the 1 is selected from a zero and a positive integer number.

In some embodiments, the processor 340 is also capable of identifying, based on the position information, the position of the OFDM symbols of the short PUCCH included in the slot, the short PUCCH spanning a number of OFDM symbols from a last OFDM symbol of the slot. In such embodiments, the number of OFDM symbols is dynamically or semi-statically allocated by a higher layer signaling received from the eNB, the number of OFDM symbols being determined by a positive integer number.

In some embodiments, the processor 340 is also capable of determining the OFDM symbols included in the slot based on the format information.

In some embodiments, the processor 340 is also capable of blindly searching the downlink control information included in each of the plurality of subbands, wherein each of the plurality of subbands comprises different control information for different data group. In such embodiments, the at least one control resource set includes a set of physical resource blocks (PRBs) for blindly searching the downlink control information, the PRBs being contiguous or not contiguous in a frequency domain, the control resource set including at least one downlink control information (DCI) message.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 300 illustrates one example of UE 116, various changes may be made to FIG. 3 300. For example, various components in FIG. 3 300 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 300 illustrates the UE 116 configured as a mobile telephone or smartphone, UEs could be configured to operate as other types of mobile or stationary devices.

Figure 4A:
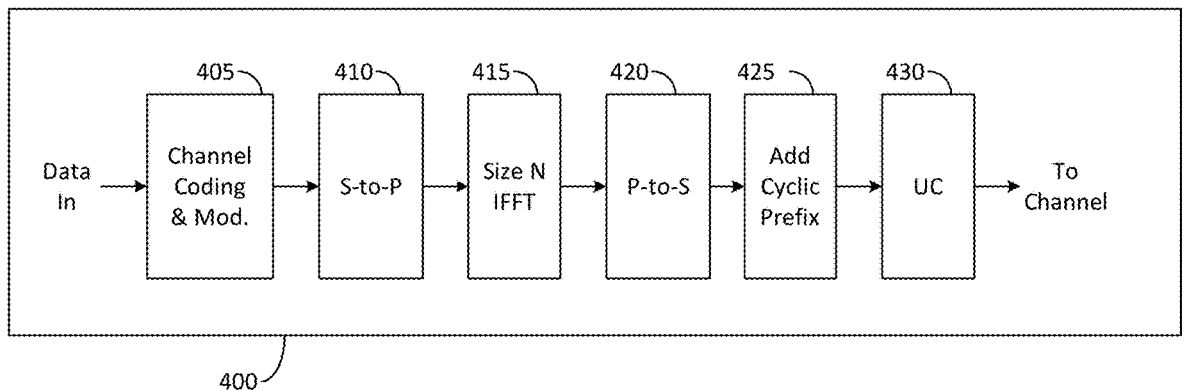
FIG. 4A illustrates a high-level diagram of an orthogonal frequency division multiple access transmit path according to embodiments of the present disclosure.
Figure 4B:
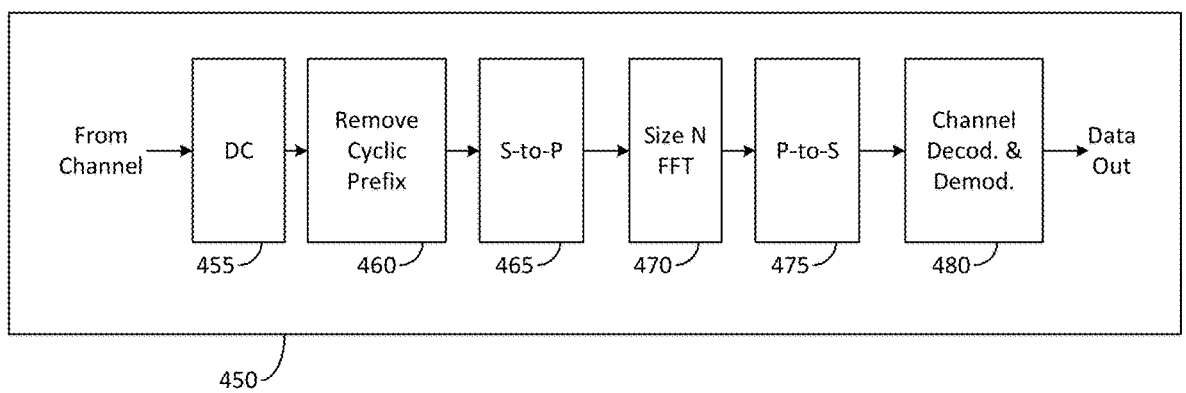
FIG. 4B illustrates a high-level diagram of an orthogonal frequency division multiple access receive path according to embodiments of the present disclosure.

FIG. 4A 400 is a high-level diagram of transmit path circuitry. For example, the transmit path circuitry may be used for an orthogonal frequency division multiple access (OFDMA) communication. FIG. 4B 450 is a high-level diagram of receive path circuitry. For example, the receive path circuitry may be used for an orthogonal frequency division multiple access (OFDMA) communication. In FIGS. 4A 400 and 4B 450, for downlink communication, the transmit path circuitry may be implemented in a base station (eNB) 102 or a relay station, and the receive path circuitry may be implemented in a user equipment (e.g. user equipment 116 of FIG. 1 100). In other examples, for uplink communication, the receive path circuitry 450 may be implemented in a base station (e.g. eNB 102 of FIG. 1 100) or a relay station, and the transmit path circuitry may be implemented in a user equipment (e.g. user equipment 116 of FIG. 1 100).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It will be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., demultiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE (e.g. Rel. 12) precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basic functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission scheme wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

In LTE technologies, a time interval X which can contain one or more of the DL transmission part, guard, UL transmission part, and a combination of thereof regardless of they are indicated dynamically and/or semi-statically. Furthermore, in one example, the DL transmission part of time interval X contains downlink control information and/or downlink data transmissions and/or reference signals. In another example, the UL transmission part of time interval X contains uplink control information and/or uplink data transmissions and/or reference signals. In addition, the usage of DL and UL does not preclude other deployment scenarios e.g., sidelink, backhaul, relay). In some embodiments of the current disclosure, "a subframe" is another name to refer to "a time interval X," or vice versa. In order for the 5G network to support these diverse services are called network slicing.

In some embodiments, "a subframe" and "a time slot" can be used interchangeably. In some embodiments, "a sub-frame" refers to a transmit time interval (TTI), which may comprise an aggregation of "time slots" for UE's data transmission/reception.

Figure 5:
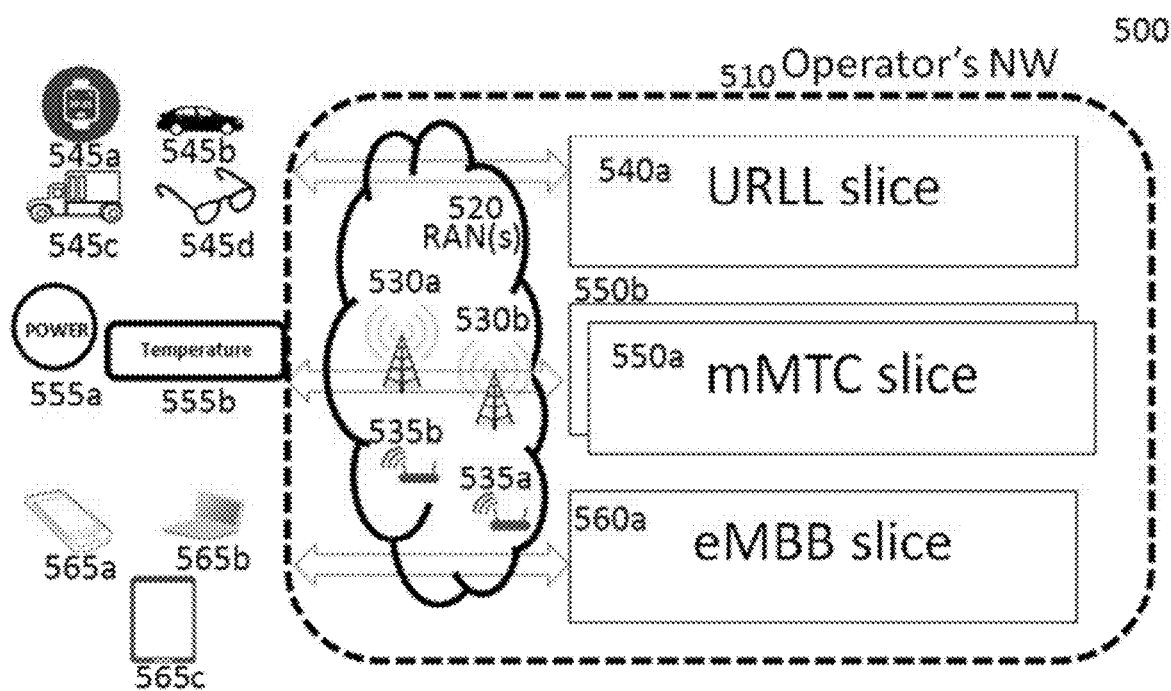
FIG. 5 illustrates a network slicing according to embodiments of the present disclosure.

FIG. 5 500 illustrates a network slicing according to embodiments of the present disclosure. An embodiment of the network slicing shown in FIG. 5 500 is for illustration only. One or more of the components illustrated in FIG. 5 500 can be implemented in specialized circuitry configured to perform the noted functions or one or more of the components can be implemented by one or more processors executing instructions to perform the noted functions. Other embodiments are used without departing from the scope of the present disclosure. As shown in FIG. 5 500, the network slicing comprises a operator's network 510, a plurality of RANS 520, a plurality of eNB s 530a, 530b, a plurality of small cell base station 535a, 535b, a URLL slice 540a, a smart watch 545a, a car 545b, a,truck 545c, a smart grasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a method to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 500 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
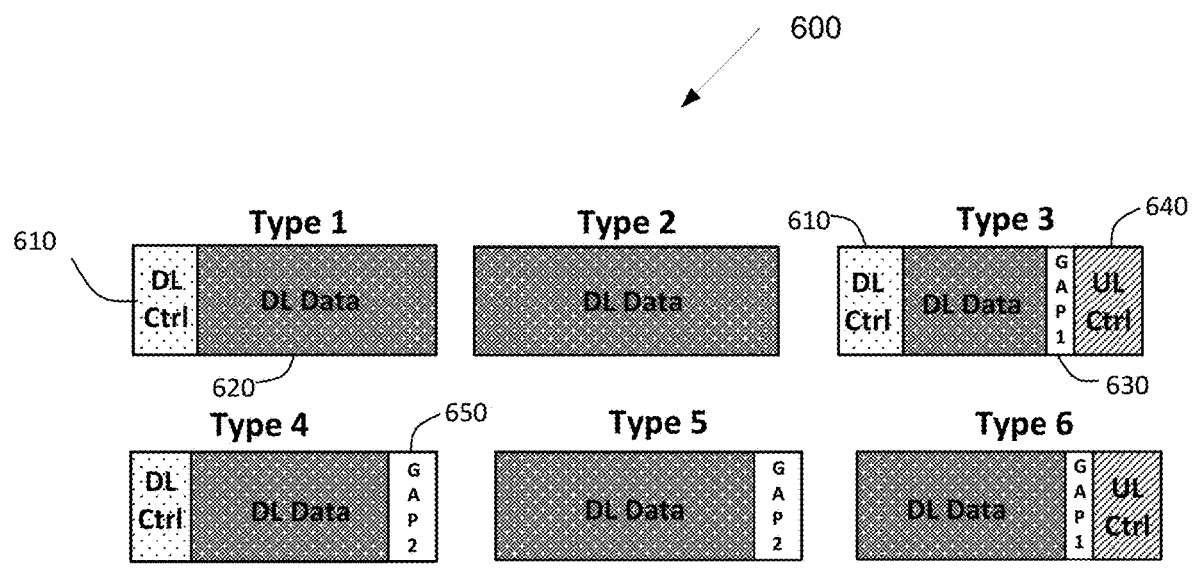
FIG. 6 illustrates a building-block sub-frame (BBSF) structures of downlink (DL) data-heavy types according to embodiments of the present disclosure.

FIG. 6 600 illustrates a building-block sub-frame (BBSF) structures of downlink (DL) data-heavy types according to embodiments of the present disclosure. An embodiment of the BBSF structures of DL data-heavy types shown in FIG. 6 600 is for illustration only. One or more of the components illustrated in FIG. 6 600 can be implemented in specialized circuitry configured to perform the noted functions or one or more of the components can be implemented by one or more processors executing instructions to perform the noted functions. Other embodiments are used without departing from the scope of the present disclosure.

FIG. 6 600 illustrates sub-frame structures that are referred to as building-block sub-frames. In FIG. 6, the horizontal dimension represents time, whereas the vertical dimension represents frequency. The frequency occupancy of a SF may or may not equal the bandwidth of the system. Further, the frequency occupancy of different portions of a BBSF may be different. In one example, in BBSF Type 1 in FIG. 6, the frequency occupancy of the "DL Ctrl" portion may be different than that of the "DL Data" portion, and the frequency occupancy of portions of the "DL Ctrl" occurring at different times may be different. All these BBSFs have the same time duration, measured either in absolute time or orthogonal frequency division multiplexing (OFDM) symbol units. As an example, each of the BBSFs could comprise 14 OFDM symbols in time and span duration of 0.2 millisecond (ms).

It may be noted that more than one of the BBSFs in FIG. 6 may occupy the same frequency resources in the same time duration. In one example, BBSFs of Types 1 and 2 in FIG. 6 comprise entirely of transmissions from the eNodeB to the UE over a certain set of frequency resources for certain time duration. An eNodeB (eNB) may be equipped with an antenna array or multiple sets of antennas arrays, with the capability of transmitting along several spatial directions at the same time. Such an eNodeB may simultaneously transmit a BBSF Type 1 occupying a first set of frequency resources to a first set of UEs along a certain first direction, and a BBSF Type 2 occupying the same first set of frequency resources to a second set of UEs along a second direction.

In the present disclosure, "DL" represents a downlink transmission (eNodeB to UE, eNodeB transmits and UE receives), "UL" refers to an uplink transmission (UE to eNodeB, UE transmits and eNodeB receives). "Ctrl" represents a control channel; "DL Ctrl", 610, represents a control channel transmitted from the eNodeB to the UE, which informs the UE about details of the data or further control transmissions to follow, such as the duration, modulation & coding scheme (MCS) used for that transmission, etc. Similarly, "UL Ctrl", 640, represents a control channel transmitted from the UE to the eNodeB, which informs the eNodeB about details of the data or further control transmissions to follow, such as the duration, modulation & coding scheme (MCS) used for that transmission.

The control region of a SF (610 for DL or 640 for UL) may contain several control channels. A DL control channel in a particular SF may include acknowledgement-negative acknowledgement (Ack-Nack) feedback for UL data transmissions in previous or current SF(s). The DL control region in a particular SF may include channels with pilot or reference samples to aid the UEs in obtaining system timing and correct for hardware impairments, such as the mismatch between the oscillator frequencies of the UE and the eNodeB.

A term PDCCH (physical downlink control channel) will be used to refer to a particular DL control channel. In one example, the DL control region 610 may at least partly comprise of a first set of physical downlink control channels (PDCCHs), wherein each PDCCH in the set contains information that has relevance to, i.e., is recoverable (can be demodulated, decoded and interpreted) a specific UE among a first set of UEs. Furthermore, the DL control region 610 may at least partly consist of a second set of PDCCHs, each of which has relevance to each UE in a second set of UEs, which may or may not overlap with the first set. The first and second set of PDCCHs are referred to as the unicast and multicast PDCCHs, respectively.

The location of a PDCCH in the time-frequency grid may be conveyed to a UE served by that PDCCH via semi-static RRC signaling. Alternatively, the PDCCH may recur at known frequency locations according to a time schedule defined in the system specifications. Similarly and in addition, the MCS used to encode and modulate the PDCCH, as well as the mapping to the SF time-frequency grid of the modulated samples of the control information portion of relevance to the UE is also known to the UE.

A set of subframes carrying a PDCCH, as well as a set of UEs w.r.t which the control information carried in the PDCCH has relevance, may be a function of time as well as of the spatial or eNodeB transmission direction. In one embodiment, an eNodeB may transmit in a certain first direction a first BBSF occupying a certain set of frequency resources and containing a first PDCCH occupying a first set of locations in the SF time frequency grid. During the same time period and over the same set of frequency resources as the first BBSF, the eNodeB may transmit in a certain second direction a second BBSF containing a second PDCCH occupying either the first or a second set of locations in the SF time frequency grid. In such embodiments, the eNodeB may convey the locations of the first and second PDCCHs to a first and second set of UEs, which may or may not be overlapping. Further, in such embodiments, the control information carried in the PDCCH has simultaneous relevance to the first and second sets of UEs.

In some embodiments, a set of subframes used to transmit a PDCCH or other DL control channel 610 also contain "common reference signal (CRS)" or "common reference symbols", which refer to a set of pilot reference samples with locations known to all UEs, and used to demodulate the respective control channel.

On the uplink, A/N or CSI feedback can be configured to be transmitted in UL ctrl 640, than UL data channels. A/N refers to the Ack-Nack feedback from a UE regarding the reception success or failure of a downlink data packet; the time-frequency grid of the SF used to transmit the A/N also contains pilot reference samples known to all UEs used to demodulate the control channel.

In such embodiments, "Data" represents a channel containing application information being conveyed in the SF; "DL/UL" represents the direction (eNodeB to UE/UE to eNodeB). It may be used that the term physical downlink shared channel (PDSCH) is referred to the data channel on the DL 620. The time-frequency grid of the SF used to transmit the DL 620 (e.g., PDSCH) also contains the "UE-RS", which refers to a set of pilot reference samples that are specific to the UE for whom the data channel/PDSCH 620 is intended.

A data packet (or transport block), which is carried by the REs in the data channel, refers to a set of modulation symbols, that are the result of a modulation and an encoding operation on a set of bits consisting of a set of information bits and a set of cyclic redundancy check (CRC) bits appended to the set of information bits. Each CRC bit is a certain linear combination of the information bits. After performing the decoding operation at the UE, the UE may determine if the packet was received correctly by calculating the CRC bits from the decoded information bits and comparing them to the transmitted CRC bits. A match between the transmitted CRC bits and the CRC bits calculated from the received information bits leads to the data packet being declared as having been received correctly.

A data packet (or a transport block) may be transmitted within a SF or a set of SFs. On the DL, both the eNodeB and the UE for which the data packet is intended have knowledge about the mapping between the data packet bits and the SFs.

GAP 1 630 represents a gap of a first number of OFDM symbol (or a first time duration), whereas GAP 2 650 represents a gap of a second number of OFDM symbols (or a second time duration). During the GAP, UE is not expected to receive DL signal. In some embodiments, GAP 2 650 is longer than GAP 1 630. In some embodiments, GAP 1 630 partitions the DL and UL portions of the SF. This gap allows the UE to switch from reception (DL) to transmission mode (UL). In some embodiments, the length of GAP 2 650 is equal to the sum of the length of GAP 1 630 and the length of UL ctrl 640.

The types of BBSFs in FIG. 6 are referred to as DL data-heavy types since they are intended primarily to transmit DL data; nominally, the "DL Data" portion 620 of these BBSFs would be the dominant portion in terms of the SF time-frequency resources occupied.

Ultra-reliable and low latency (URLL) traffic can arrive at any time, to any direction (DL or UL). A possible requirement for URLL is that the URLL traffic needs to be served within 1 ms in physical layer (PHY) after arrival of the traffic. In addition, another requirement is that the PHY block error rate (BLER) may be as low as $10^{-4}$.

In the present disclosure, novel frame structures are disclosed, which are constructed to meet these URLL requirements, while also ensuring high data rate to eMBB traffic. Such a frame structure comprises subframes time-varying types of BBSFs. BBSF types of the individual subframes are indicated to the UE by DL control signaling. In one embodiment, BBSF types are dynamically indicated in DL ctrl 210. In another embodiment, BBSF types are semi-statically indicated to each UE via RRC signaling. In yet another embodiment, a candidate set of BBSF types are semi-statically indicated to each UE via RRC signaling, and a BBSF type within the candidate set is dynamically indicated in DL ctrl 610.

In some embodiments, a UE is configured with type 1 subframe (DL ctrl+DL data) as a DL URLL subframe, and furthermore, the UE is configured with no PHY hybrid automatic repeat request (HARQ) A/N and no HARQ re-transmissions. This alternative makes sense when the first round BLER target is $10^{-4}$. In this case, the URLL latency target can be met as long as the packet size of DL data 620 transmitted in a single subframe is as large as an arrived URLL packet size, and the subframe duration is less than 1 msec.

In some embodiments, a UE is configured with type 3 subframe (DL ctrl+DL data+UL ctrl) as a DL URLL subframe, and furthermore, the UE is configured to feed back HARQ A/N in a subsequent UL ctrl region 640 for DL data 620. This alternative makes sense when the first round BLER target is not as small as $10^{-4}$, but similar to UL Ctrl target BLER, e.g., $10^{-2}$. To meet the reliability target, a UE may need to request HARQ retransmissions. Suppose that data BLER target is around $10^{-2}$; then if one re-transmission is allowed, the resulting BLER can be around $10^{-4}$. The latency target can be met if the duration of two subframes is less than 1 msec, and the UL ctrl 640 can contain A/N for the UL data 620 in the same subframe; or if the duration of three subframes is less than 1 msec, and the UL ctrl 640 can contain A/N for the UL data 620 in one subframe before.

In some embodiments, a UE can be configured to receive either type 1 subframe or type 3 subframe as a URLL subframe, in a higher-layer such as medium access control (MAC) or radio resource control (RRC).

In some embodiments, a UE is configured with a set of subframe indices (e.g., in terms of time slot numbers, or subframe numbers) in the higher layer (e.g., RRC or MAC), designated for URLL packet reception. Then the UE is configured to decode PDCCH scheduling assignment related to URLL PDSCHs only in those subframes indicated by the set of subframe indices. This method allows eNodeB to flexibly provision resources that can be used for URLL in time domain. In one example, the resources that can be used for URLL can also be used for eMBB. If the UE is also configured with eMBB traffic reception, the UE is configured to receive PDCCH scheduling assignment related to eMBB PDSCHs in all the subframes that contains DL ctrl 610.

In some embodiments, a UE can be configured with a set of subframe indices in the higher layer (e.g., RRC or MAC), for which the UE shall assume the DL ctrl 610 is present. When configured with the set of subframe indices, the UE is not required to decode PDCCH in the other subframes.

In some embodiments, the UL ctrl 640 comprises a number of OFDM symbols, and a UE is configured to transmit A/N for DL data 620 in subframe x in an l-th symbol from the last OFDM symbol of subframe x+k, where k=0, 1, 2, ..., can be either dynamically/semi-statically indicated or a constant.

A few scheme to configure an integer l=0, 1, 2, 3, ..., which represents the number of OFDM symbols for UL ctrl 640, is devised. In one embodiment, the integer l is constant (e.g., 1 or 2). In another embodiment, the integer l is semi-statically configured per UE. In yet another method, the integer l is dynamically signaled in DL ctrl 610 either in subframe x or in subframe x+k, and possible value of l is an integer m multiple of another integer, say L.

In one example, l=mL, wherein L (e.g., is equal to 1, 2, or 3 or any other positive integer) is fixed in a standards specification, and m=0, 1, 2, 3 ..., is dynamically signaled. One benefit of this method is that eNB can dynamically and UE-specifically configure the length of UL ctrl 640, e.g., depending upon the link strength. For UE with strong link, the eNB can configure a smaller m, and for UE with weak link, the eNB can configure a large m. This way, the eNB can flexibly guarantee UL control coverage.

In some embodiments, a frame is defined as a concatenation of a certain number of BBSFs in the time dimension. The number of BBSFs in a frame may be as low as one, in which case a frame is equal to a subframe, or a transmit time interval (TTI). The number and types of BBSFs in a frame may be determined by different embodiments of this disclosure.

According to the aforementioned embodiments, a frame could consist of N BBSFs, numbered from n (current subframe) to n+N−1, with the determination of the value of N described below.

As an example, the BBSFs, with each BBSF consisting of 14 OFDM symbols spanning 0.2 ms, respectively, may be organized in time into units of frames, where each frame consists of 5 BBSFs spanning 70 OFDM symbols and 1 ms in time.

In some embodiments, the first BBSF in a certain type of frames, in time order, is of a type that contains a DL control region 610. In some embodiments, the DL ctrl region 610 may contain a multicast and unicast regions. The multicast region comprises multicast PDCCH(s), each of which is relevant to a first set of UEs. The unicast region comprises unicast PDCCHs, each of which can convey control information relevant to a particular UE among a second set of UEs, wherein the second set of UEs may or may not overlap with the first set.

In some embodiments, UE is configured with type 3 subframe (DL ctrl+DL data+UL ctrl) as a DL eMBB subframe, and furthermore, the UE is configured to feed back HARQ A/N in a subsequent UL ctrl region 640 for DL data 620. This alternative can be used when eMBB traffic is multiplexed in the same subframe as URLL traffic. However, in this case eMBB UEs can suffer from large overhead, due to frequent DL/UL transition and gap1 630, and UL control region 640 (e.g., overhead).

Figure 7:
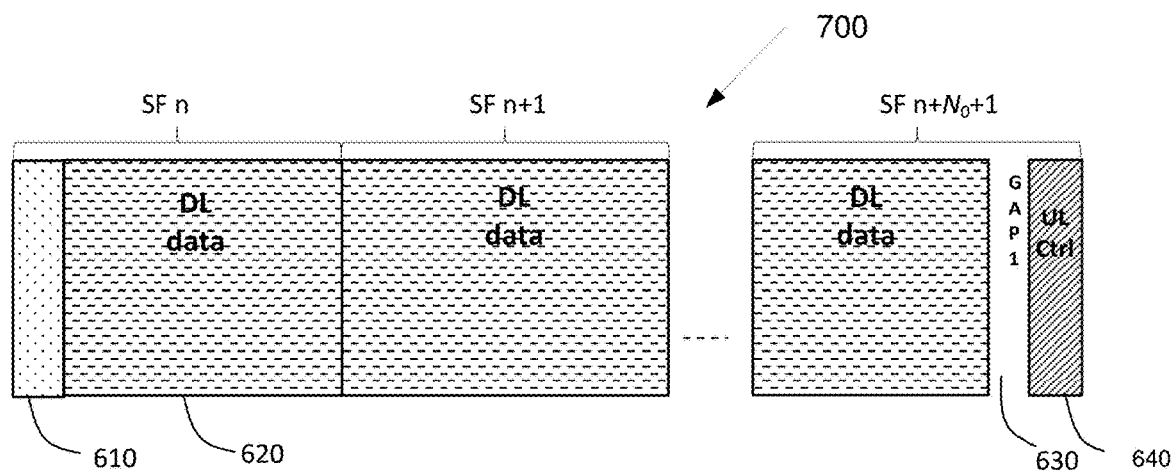
FIG. 7 illustrates an aggregation of subframes according to embodiments of the present disclosure.

FIG. 7 700 illustrates an aggregation of subframes according to embodiments of the present disclosure. An embodiment of aggregation of subframes shown in FIG. 7 700 is for illustration only. One or more of the components illustrated in FIG. 7 700 can be implemented in specialized circuitry configured to perform the noted functions or one or more of the components can be implemented by one or more processors executing instructions to perform the noted functions. Other embodiments are used without departing from the scope of the present disclosure.

In some embodiments of an eMBB frame type A as shown in FIG. 7, a UE is configured with a series of subframes 700: one type 1 subframe (DL ctrl+DL data), followed by an $N_0$ number of type 2 subframes (DL data only), followed by type 6 subframe (DL data+gap1+UL ctrl), as an aggregation of subframes for DL eMBB traffic. In such embodiments, the aggregation of the subframe can be used either when eMBB is TDM'ed with URLL or; eMBB is FDM'ed with URLL but no HARQ transmission is configured for the URLL traffics.

Figure 8:
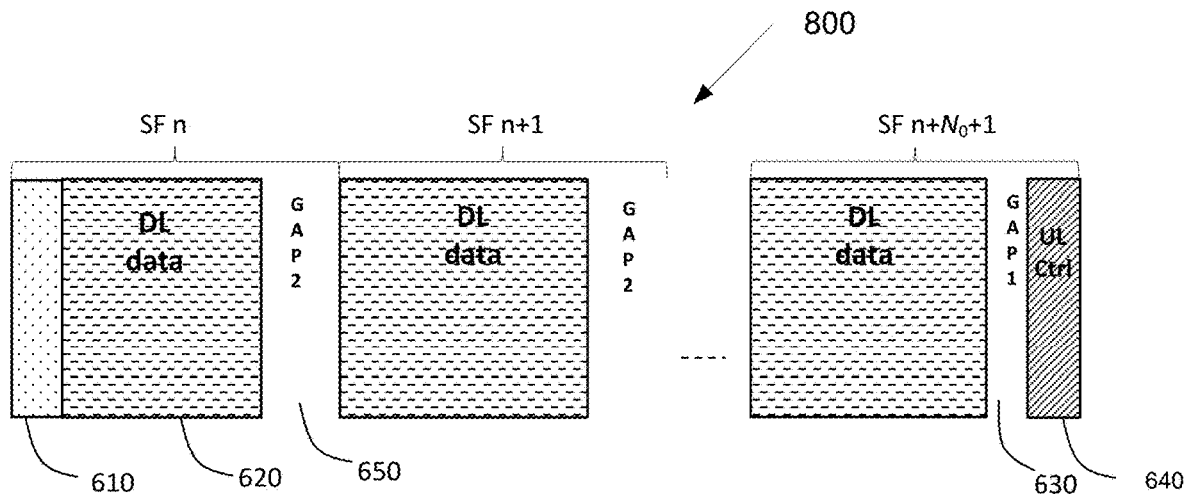
FIG. 8 illustrates another aggregation of subframes according to embodiments of the present disclosure.

FIG. 8 800 illustrates another aggregation of subframes according to embodiments of the present disclosure. An embodiment of another aggregation of subframes shown in FIG. 8 800 is for illustration only. One or more of the components illustrated in FIG. 8 800 can be implemented in specialized circuitry configured to perform the noted functions or one or more of the components can be implemented by one or more processors executing instructions to perform the noted functions. Other embodiments are used without departing from the scope of the present disclosure.

In some embodiments of an eMBB frame type B as shown in FIG. 8, a UE is configured with a series of subframes 800, one type 4 subframe, followed by an $N_0$ number of type 5 subframes, followed by type 6 subframe, as an aggregation of subframes for DL eMBB traffic. In such embodiments, the aggregation of subframes can be used either when eMBB is FDM'ed with URLL, or and HARQ transmission is configured for the URLL traffics.

Figure 9:
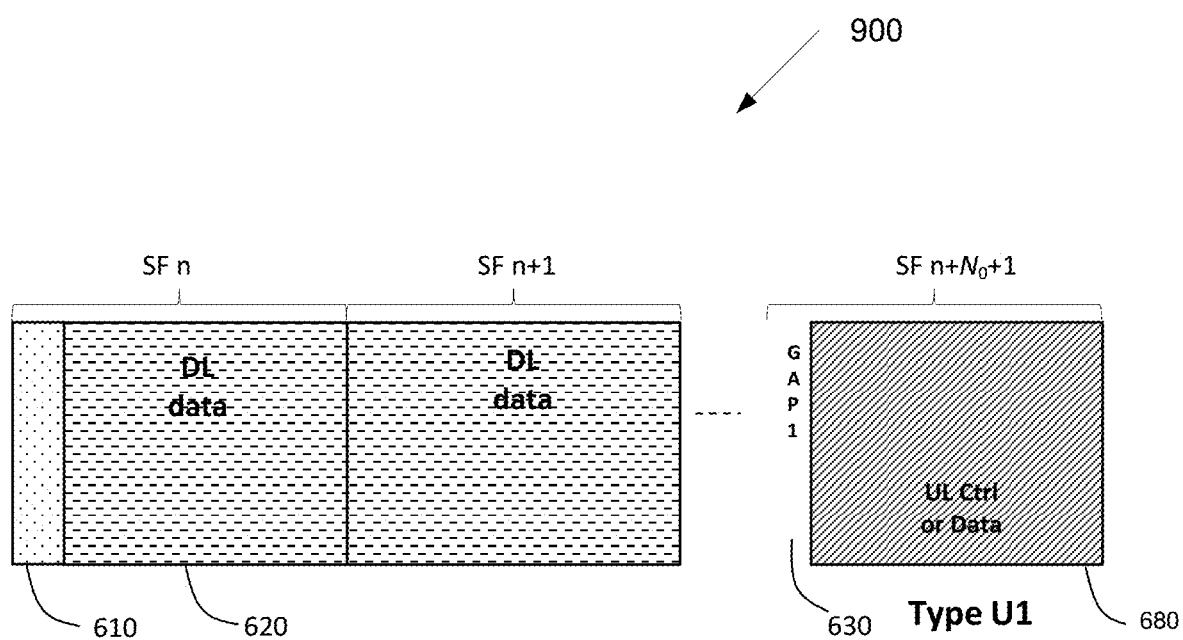
FIG. 9 illustrates yet another aggregation of subframes according to embodiments of the present disclosure.

FIG. 9 900 illustrates yet another aggregation of subframes according to embodiments of the present disclosure. An embodiment of yet another aggregation of subframes shown in FIG. 9 900 is for illustration only. One or more of the components illustrated in FIG. 9 900 can be implemented in specialized circuitry configured to perform the noted functions or one or more of the components can be implemented by one or more processors executing instructions to perform the noted functions. Other embodiments are used without departing from the scope of the present disclosure.

In some embodiments of an eMBB frame type C as shown in FIG. 9, a UE is configured with a series of subframes 900: one type 1 subframe (DL ctrl+DL data), followed by an $N_0$ number of type 2 subframes (DL data only), followed by a type U1 subframe that contains (gap1 630 and UL ctrl or data 680), as an aggregation of subframes for DL eMBB traffic. The aggregation of subframes according to these embodiments is illustrated in FIG. 9. In such embodiments, the aggregation of subframes can be used either when eMBB is TDM'ed with URLL or; eMBB is FDM'ed with URLL but no HARQ transmission is configured for the URLL traffics. In such embodiments, good UL control coverage may be achieved, and a UL multiple access in SF n+N0+1 may be allowed. The DL ctrl 610 can carry a PDCCH for a first UE for a DL assignment on subframes n through n+$N_0$; and also a PDCCH for a second UE for a UL grant on subframe n+$N_0$+1. UL ctrl or data 680 can be used by a number of UEs. The first UE can report A/N on DL data 620 transmitted in subframes prior to subframe n+$N_0$+1. The second UE can transmit UL data according to the UL grant. In such embodiments, the overhead channels can be reduced as compared to the case of using type 3 subframe for DL eMBB traffic, and hence it can increase DL throughput for eMBB.

In some embodiments, a UE can be configured to receive either type 3 subframe or a series of subframes for eMBB traffic, in a higher-layer (e.g., MAC or RRC). The series of subframes constructed in these embodiments can also be referred to as a frame of subframes in other embodiments.

In some embodiments, a UE can be configured to receive an indication of subframe types of a current and subsequent subframes which may comprise a frame, also denoted as frame composition indication, in a DCI in multicast or unicast PDCCH transmitted in DL ctrl 210.

In one example, one-bit indication: either a series (frame) of $N_0$ subframes or a single subframe: The frame composition indication is one-bit information indicating the following information: 1) State 1: A series of $N_0$+2 subframes of a certain frame type (e.g., frame type A, B, and C of 700 in FIG. 7, 800 in FIG. 8, and 900 in FIG. 9) are configured by the PDCCH; and 2) State 0: A single subframe (e.g., of type 1 or type 3) is configured by the PDCCH.

In another example, one-bit indication: either a series of a pair of subframes or a single subframe. The frame composition indication is one-bit information, indicating the following information: 1) State 1: Two subframes of a certain frame type (e.g., frame type A, B, and C of 700 in FIG. 7, 800 in FIG. 8, and 900 in FIG. 9) are configured by the PDCCH; and 2) State 0: A single subframe (e.g., of type 1 or type 3) is configured by the PDCCH.

In yet another example of ($N_0$+1)-state indication, a number of subframes (maybe in terms of $N_0$) and subframe types of a series of subframes are jointly indicated. The frame composition indication has $N_0$+1 states (i.e., of ceil ($\log_2(N_0+1)$) bits) and indicates the following information. In this case effectively $N_0$ is dynamically signaled: 1) State 2, . . . , $N_0$+1: A series of $N_0$+2 subframes of a certain frame type (e.g., frame type A, B, and C of 700 in FIG. 7, 800 in FIG. 8, and 900 in FIG. 9) are configured by the PDCCH; 2) State 1: Two subframes of a certain frame type (e.g., frame type A, B, and C of 700 in FIG. 7, 800 in FIG. 8, and

900 in FIG. 9) are configured by the PDCCH; and 3) State 0: A single subframe (e.g., of type 1 or type 3) is configured by the PDCCH.

For the frame composition indication in these embodiments, some of the following additional information may be necessary: $N_0$ and a frame type (e.g., indication of one of 700 in FIG. 7, 800 in FIG. 8, and 900 in FIG. 9). Each of these additional information can be higher-layer configured, or fixed in a standard specification.

In some embodiments, an indicator field, namely, FrameComposition, is present both in a unicast and in a multicast PDCCH. Each value of FrameComposition indicates a certain frame structure comprising a number of subframes in a frame and BBSF types of those subframes, according to a mapping table. A FrameComposition consisting of N bits can indicate $2^N$ frame structures via the $2^N$ possible values that the N bits can represent. For example, when N=10, FrameComposition indicates one of the $2^{10}=1024$ frame structures. In such embodiments, FrameComposition jointly indicates some or all of the following information: 1) A frame structure; 2) A/N resource (including subframe index to map A/N) for each transport block scheduled in the frame; and 3) SRS trigger (and also SRS resource in some embodiments).

The mapping from a value of FrameComposition to a frame structure, corresponding A/N resource & SRS mapping can be defined in terms of a look-up table, where the look-up table can be indicated as follows: 1) via part of the system specifications and hence known to all eNodeBs and UEs; 2) via semi-static higher-layer (RRC) signaling from the eNodeB to the UE; and 3) via PDCCH signaling. A PDCCH of relevance to the UE may carry an indicator field referred to as the FrameStructureMappingUpdateInd, wherein a particular first value of this field indicates to the UE that the PDCCH contains an update to the look-up table mapping values of FrameComposition to the frame structure. A value of the FrameStructureMappingUpdateInd other than the first value may indicate the absence of a look-up table update.

Alternatively, the mapping is defined, instead of signaling a look-up table, the eNodeB may explicitly indicate the frame structure as (1) a set of frequency partitions, and (2) the time sequence of BBSF type numbers occupying each of the set of frequency partitions. FrameStructureMappingUpdateInd indicator field can also be used in this alternative. An occurrence of the first value of the FrameStructureMappingUpdateInd indicator field would indicate an update to the frame structure.

In some embodiments, a frame is configured to comprise the first subframe in time order of a subframe type that contains a DL control region 210. The first subframe in these embodiments are called an indicator subframe, and the frame is called an indicator frame. A frame configured to comprise the first subframe of a subframe type that does not contain a DL control region 610 is called non-indicator frame.

In such embodiments: with an indicator frame/subframe numbered 1 and followed by a number (M−1) of non-indicator frames/subframes numbered from 2 to M in time order, M>1; the PDCCH in the first indicator frame/subframe contains a number P of FrameComposition indicator fields numbered from 1 to P, along with another set of P indicator fields referred to as FrameCompositionDuration also numbered from 1 to P, wherein the FrameCompositionDuration field numbered k, with 1<=k<=P, indicates a number $M_k$ of frames/subframes for which the FrameComposition field also numbered k is applicable, with the sum of the numbers $M_1$ to $M_P$ equaling M, $$\text{i.e., } \sum_{j=1}^{P} M_j = M;$$

and then, the FrameComposition field numbered 1 is applicable from Frame/SF #1 to Frame/SF #($M_1$−1). The FrameComposition field numbered k, with 2<=k<=P, is applicable from $$\text{Frame/SF } \#\left(\sum_{j=1}^{k-1} M_j\right) \text{ to Frame/SF } \#\left(\left(\sum_{j=1}^{k} M_j\right) - 1\right).$$

In some embodiments, the frame composition indication is included in a DCI transmitted in a multicast PDCCH; and the PDSCH assignment indication is included in a DCI transmitted in a unicast PDCCH. In one example, the UE is further configured to receive P PDSCHs in the configured frame, wherein P Å{1, . . . , $N_0$+1}, according to the indicated state of frame composition indication: when the indicated frame type is of a single subframe (i.e., when state of frame composition is 0), the UE is configured to receive PDSCH only in the current subframe n. In this case, P=1; and when the indicated frame type is of ($N_0$+2) subframes, wherein $N_0 \in \{0,1,2, \ldots\}$, (i.e., when state of subframe composition indication is nonzero according to some embodiments), the UE is configured to receive PDSCHs in those ($N_0$+2) subframes: i.e., subframes n+k, k ∈{1, . . . , $N_0$+1}. In this case P=$N_0$+1.

In another example, a UE is further configured to receive P PDSCHs in the configured frame, wherein P ∈{1, . . . , $N_0$+1}, by a DCI (a DL assignment DCI) in a unicast PDCCH, which indicates a set of P subframe offset numbers {k}.

In some embodiments, a UE is further configured to receive a PUSCH in subframe n+$N_0$+1, when frame type 3C, 900 is configured, by a DCI (a UL grant DCI) in a unicast PDCCH.

In some embodiments, a DCI including PDSCH assignment may also include additional information to the UE. In one example, the UE is further configured to receive one TB per PDSCH-assigned subframe, the DCI in the unicast PDCCH further indicates P HARQ process numbers for the TBs in the PDSCH scheduled subframes. With regards to the subframes for the UE to report A/N for the P TBs, a few methods are considered.

In another example, P subframe offset numbers {m}, to report A/N for the p-th scheduled TB are also indicated in the DCI. In this case, the A/N for the p-th scheduled TB is reported in subframe n+m, m ∈{0, 1, 2, . . . }.

In yet another example, the A/N for all the P TBs are reported in subframe either n+$N_0$+1 (if >1 subframes are configured in the frame) or n (if 1 subframe is configured in the frame). In yet another example, if >1 subframes are configured in the frame, the A/N for the TBs in subframes other than n+$N_0$+1 are reported in subframe n+$N_0$+1, and the A/N for the TB in subframe n+$N_0$+1 is scheduled to be reported in the next scheduled UL ctrl 260 indicated in the next frame composition indication. If one subframe is configured in the frame, the A/N for the TB in the subframe is scheduled to be reported in the next scheduled UL ctrl 260 indicated in the next frame composition indication. In yet another example, the UE is further configured to receive a single TB in the configured frame. In this case, the DCI in the unicast PDCCH further indicates a single HARQ process number for the TB in the PDSCH scheduled subframes. With regards to the subframes for the UE to report A/N for the P TBs, a few methods are considered.

In some embodiments, a single subframe offset number m, to report A/N for the scheduled TB is also indicated in the DCI. In this case, the A/N for the TB is reported in subframe n+m, m $\in \{0, 1, 2, \ldots \}$. In another embodiments, the A/N for the scheduled TB is reported in subframe either $n+N_0+1$ (if >1 subframes are configured in the frame) or n (if 1 subframe is configured in the frame). In yet another embodiments, if >1 subframes are configured in the frame and if a PDSCH is not scheduled in subframe $n+N_0+1$, the A/N for the TB is reported in subframe $n+N_0+1$; and if a PDSCH is scheduled in subframe $n+N_0+1$, the A/N for the TB is scheduled to be reported in the next scheduled UL ctrl 260 indicated in the next frame composition indication. If one subframe is configured in the frame, the A/N for the TB in the subframe is scheduled to be reported in the next scheduled UL ctrl 260 indicated in the next frame composition indication.

In such embodiments, the payload and interpretation of a DCI transmitted in a unicast PDCCH may change dependent upon the indicated frame composition in a DCI transmitted in a multi-cast PDCCH. This is because different frame compositions comprise different number of subframes, which may also result in different amount & interpretation of information in the DCI in the unicast PDCCH.

Figure 10:
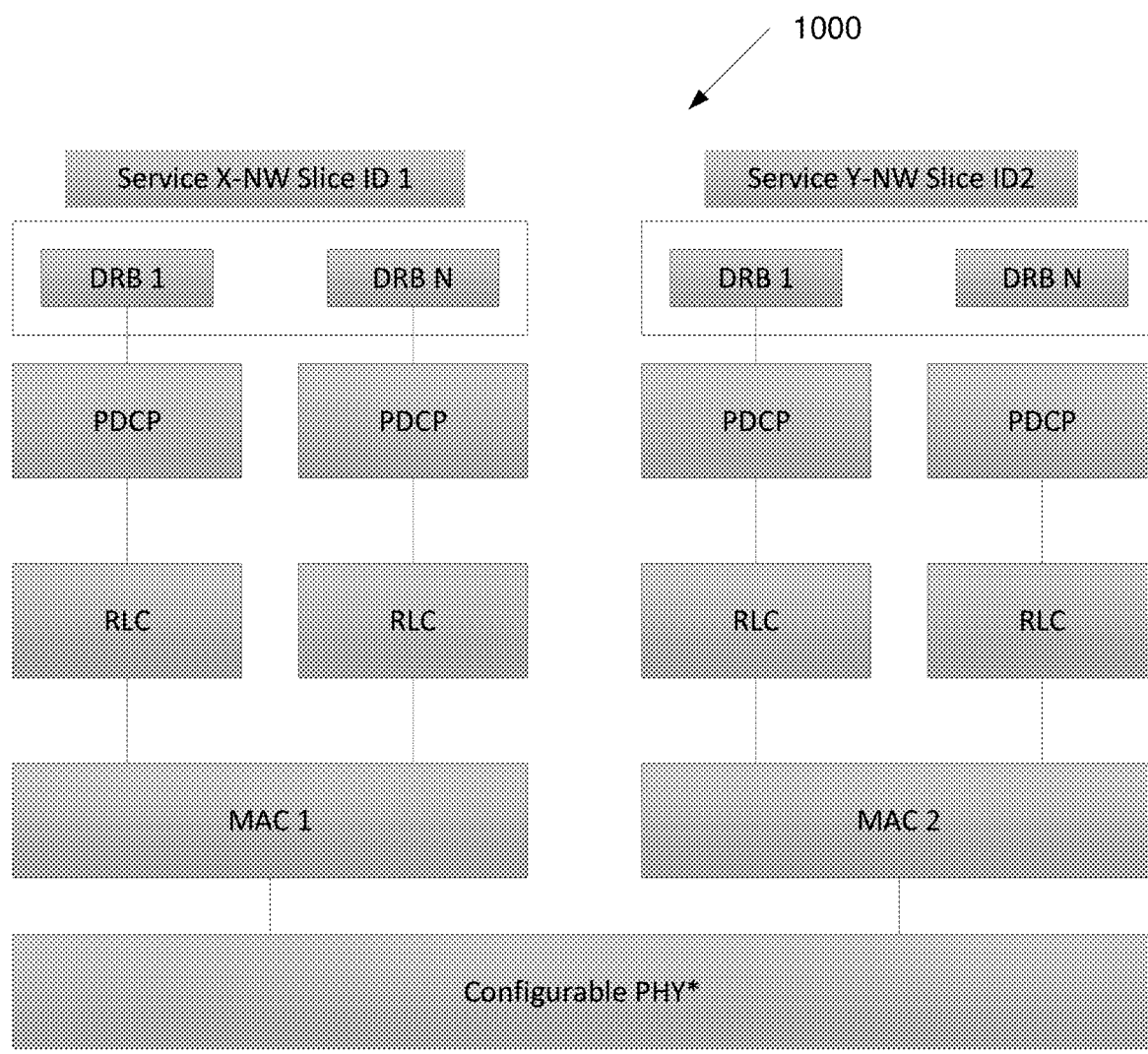
FIG. 10 illustrates a UE configuration with two slice configurations according to embodiments of the present disclosure.

FIG. 10 1000 illustrates a UE configuration with two slice configurations according to embodiments of the present disclosure according to embodiments of the present disclosure. An embodiment of the UE configuration with two slice configurations shown in FIG. 10 1000 is for illustration only. One or more of the components illustrated in FIG. 10 1000 can be implemented in specialized circuitry configured to perform the noted functions or one or more of the components can be implemented by one or more processors executing instructions to perform the noted functions. Other embodiments are used without departing from the scope of the present disclosure.

In some embodiments, a UE can be configured with one or more slice (service) configurations in the higher layer. When the UE is configured with more than one slice configurations, for each slice configuration, a separate MAC and a separate RRC are configured as illustrated in FIG. 10.

In such embodiments, a slice configuration may comprise at least some of: 1) time-frequency resource of a DL control region 610, wherein the configuration may include a set of subframe indices (e.g., in terms of period and subframe offsets), allocated frequency resources (e.g., in terms of PRBs), and allocated time resources (i.e., in terms of OFDM symbols) for the DL control region 610; a set of DCIs to monitor in the DL control region 610; a DL transmission mode; a set of frame types that can be configured via frame composition indication or a static frame type, wherein for a slice configured for eMBB service, the frame types can be selected from frame types A, B, or C, 700 in FIG. 7, 800 in FIG. 8, and 900 in FIG. 9, and for a slice configured for URLL slice, the frame types are of a single subframe, e.g., type 1 or type 3, according to some embodiments of the current disclosure.

Example frame structures in the example case with 5 component BBSFs are illustrated in FIGS. 11-15. Each of FIGS. 11-15 illustrates a frame consisting of an example 5 BBSFs, numbered from n to (n+4), in time order. In these figures, "BW" refers to the system bandwidth; in FIGS. 14 and 15, "B1" and "B2" refer to two contiguous portions of the system bandwidth, such that B1+B2=BW. In addition, in each of FIGS. 11-15, a frame starts with a first BBSF with a DL ctrl 610 as shown in FIG. 6.

Figures 11, 12:
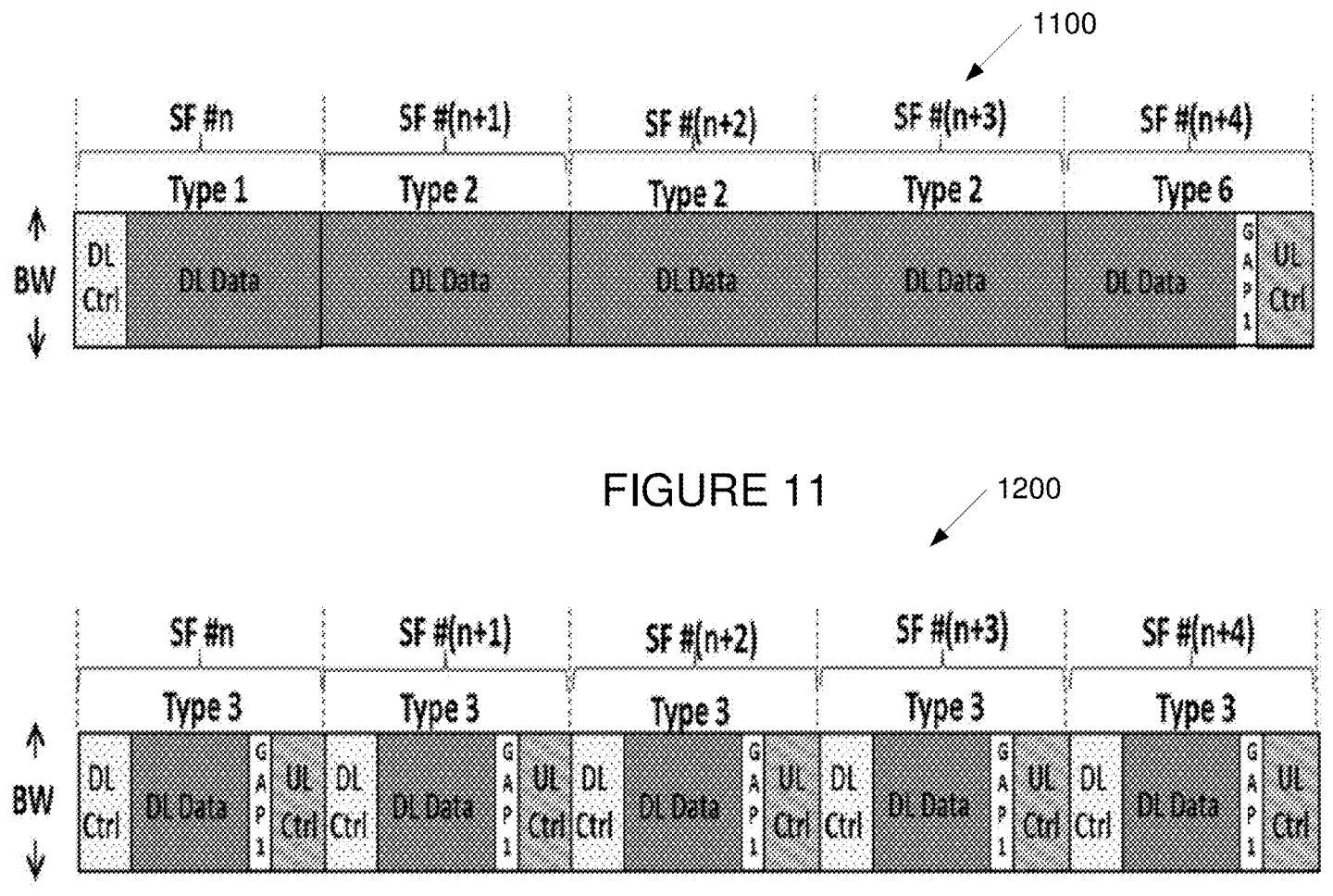

FIG. 11 1100 illustrates a frame structure with 5 BBSFs per frame and a value FrameComposition=0 according to embodiments of the present disclosure. An embodiment of the frame structure with 5 BBSFs per frame and a value FrameComposition=0 shown in FIG. 11 1100 is for illustration only. One or more of the components illustrated in FIG. 11 1100 can be implemented in specialized circuitry configured to perform the noted functions or one or more of the components can be implemented by one or more processors executing instructions to perform the noted functions. Other embodiments are used without departing from the scope of the present disclosure.

In a frame with N BBSFs, a FrameComposition value of 0 could imply a frame consisting of, in time order, a BBSF of Type1, followed by N−2 BB SFs of Type 2, followed finally by a BBSF of Type 6. FIG. 11 illustrates this case for the example value of N=5, showing a frame consisting of, in time order, BBSFs of Types 1, 2, 2, 2 and 6.

In one instance of a frame of this type (denoted as operation 1a): the UE may be indicated to send the Ack/Nacks for all the data packets sent in the frame during the UL control portion in the last BBSF. This would make the frame have the self-contained property, since both the DL data transmission and all associated Ack/Nack feedback occurs within the frame.

In one instance of a frame of this type (denoted as operation 1b) the UE may be indicated to transmit the SRS in the UL control portion of the last BBSF. Additionally, the eNodeB may indicate that the SRS is to be transmitted in the UL control region prior to the transmission of the first Ack/Nack, thus providing additional time for the UE to complete the packet decoding and Ack/Nack processing.

A frame of this type has a low control overhead, since only the $1^{st}$ and last BBSFs have control regions. Also, a resource allocation may be indicated to the UE only once, in the DL control region in the $1^{st}$ BBSF. As such, it may be suitable for a relatively delay tolerant eMBB (high throughput) service.

FIG. 12 1200 illustrates a frame structure with 5 BBSFs per frame and a value FrameComposition=1 according to embodiments of the present disclosure. An embodiment of the frame structure with 5 BBSFs per frame and a value FrameComposition=1 shown in FIG. 12 1200 is for illustration only. One or more of the components illustrated in FIG. 12 1200 can be implemented in specialized circuitry configured to perform the noted functions or one or more of the components can be implemented by one or more processors executing instructions to perform the noted functions. Other embodiments are used without departing from the scope of the present disclosure.

In a frame with N BBSFs, a FrameComposition value of 1 could imply a frame consisting of N BBSFs all of Type3. FIG. 12 illustrates this case for the example value of N=5, showing a frame consisting of 5 BBSFs all of Type 3.

In one instance of a frame of this type (denoted as operation 2a): SFs correspond to data packets, the UE may be indicated to send the Ack/Nack feedback for each data packet transmission in an SF in the UL control region of the same SF. Referring to FIG. 12, the UE may be indicated to send the Ack/Nack for the DL data packet transmitted in SF n in the UL control portion of SF n, and similarly for each of the SFs (n+1) to (n+4). The eNodeB may provision the duration of GAP1 in order to provide enough processing time to the UE so that the decoding and Ack/Nack generation can be accomplished in time for the transmission.

In one instance of a frame of this type (denoted as operation 2b): SFs correspond to data packets, and in some cases, the UE may be indicated to send the Ack/Nack feedback in the UL control region of the SF following the SF in which the data packet was transmitted. Referring to FIG. 12, the UE may be indicated to send the Ack/Nack for the DL data packet transmitted in SF n, (n+1), (n+2), (n+3) in the UL control portion of SF (n+1), (n+2), (n+3) and (n+4) respectively, and the Ack/Nack for the data packet transmitted in SF (n+4) in the UL control portion of a following BBSF. Alternatively, the eNodeB may provision the GAP1 between "DL Data" and "UL control" portions of SF (n+4) and/or indicate SRS transmission immediately following GAP1 in order to provide additional time for the UE to complete the Ack/Nack processing related to the DL packet transmitted in SF (n+4), thus enabling the Ack/Nack for that packet and retaining the self-contained frame structure (e.g., operation 4)

A frame structure of this type has a higher overhead as compared to the frame structure as in FIG. 11, but affords more flexibility w.r.t the UEs to be scheduled and the resources to be allocated to them. In addition, it affords a large number of retransmission possibilities in case of data packet failure, and hence can enable high reliability transmissions while maintaining a low delay. As such, such frame structures are more suited for URLL services.

Figure 13:
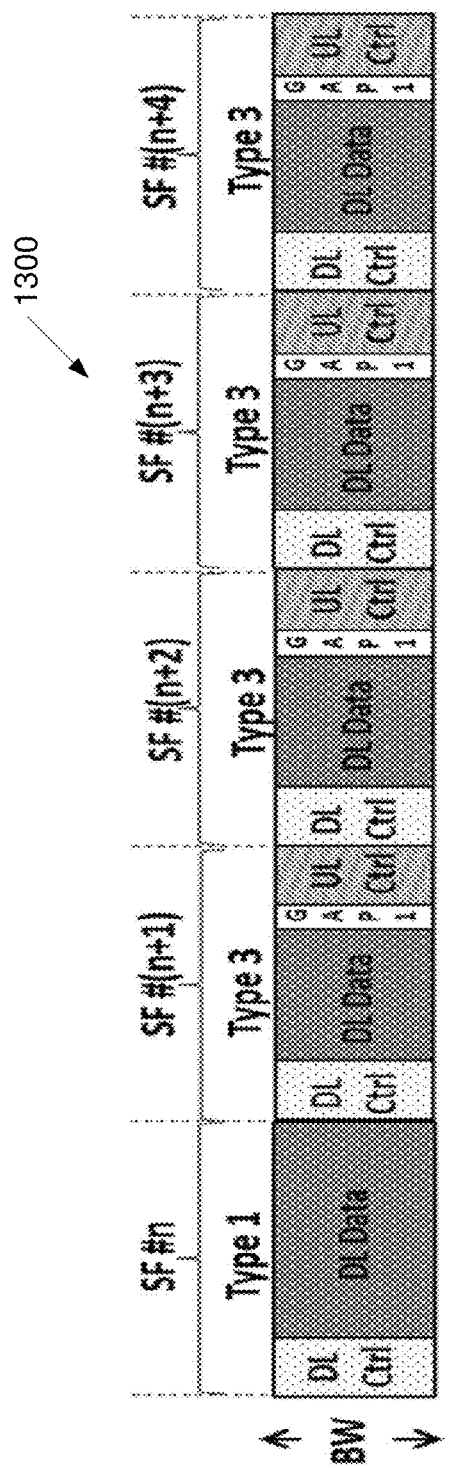
FIG. 13 illustrates a frame structure with 5 BBSFs per frame and a value FrameComposition=2 according to embodiments of the present disclosure.

FIG. 13 1300 illustrates a frame structure with 5 BBSFs per frame and a value FrameComposition=2 according to embodiments of the present disclosure. An embodiment of the frame structure with 5 BBSFs per frame and a value FrameComposition=2 shown in FIG. 13 1300 is for illustration only. One or more of the components illustrated in FIG. 13 1300 can be implemented in specialized circuitry configured to perform the noted functions or one or more of the components can be implemented by one or more processors executing instructions to perform the noted functions. Other embodiments are used without departing from the scope of the present disclosure.

The frame structure in FIG. 13 illustrates a specialization of the case in FIG. 12, wherein the first BBSF is replaced with a type that does not have the UL control region. This structure inherently allows more Ack/Nack processing time for the UE, since the Ack/Nack for the data packet in SF #n can only be sent in SF (n+1), while increasing the size of the data that can be sent in the frame. The UE may then be indicated to send the Ack/Nacks as described in FIG. 11.

Figure 14:
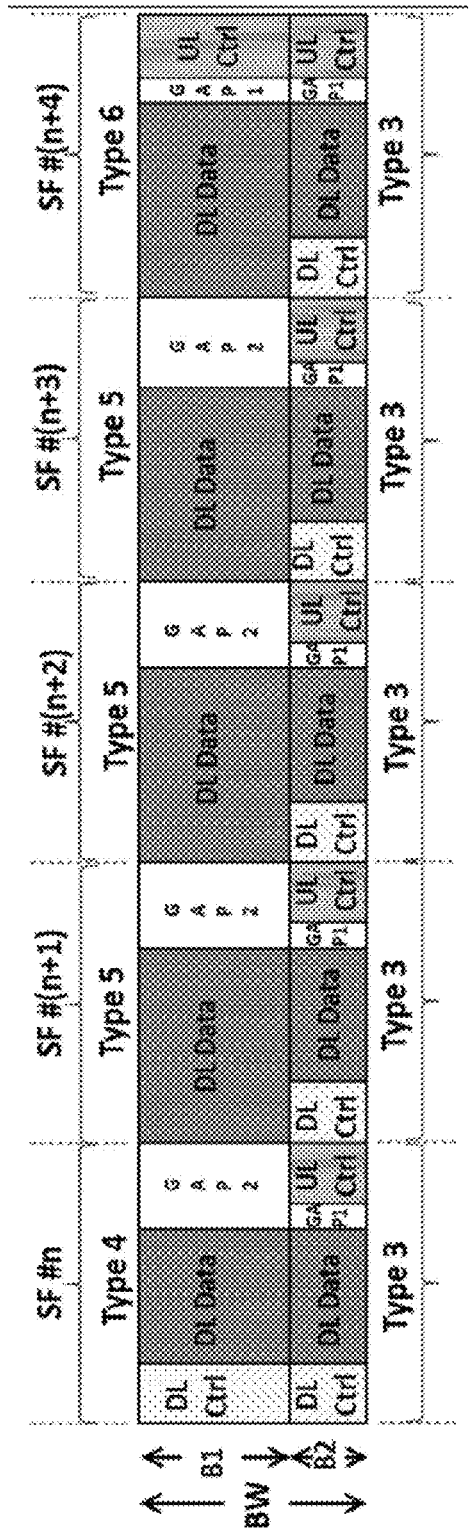
FIG. 14 illustrates a frame structure with 5 BBSFs per frame and a value FrameComposition=3 according to embodiments of the present disclosure.

FIG. 14 1400 illustrates a frame structure with 5 BBSFs per frame and a value FrameComposition=3 according to embodiments of the present disclosure. An embodiment of the frame structure with 5 BBSFs per frame and a value FrameComposition=3 shown in FIG. 14 1400 is for illustration only. One or more of the components illustrated in FIG. 14 1400 can be implemented in specialized circuitry configured to perform the noted functions or one or more of the components can be implemented by one or more processors executing instructions to perform the noted functions. Other embodiments are used without departing from the scope of the present disclosure.

Figure 15:
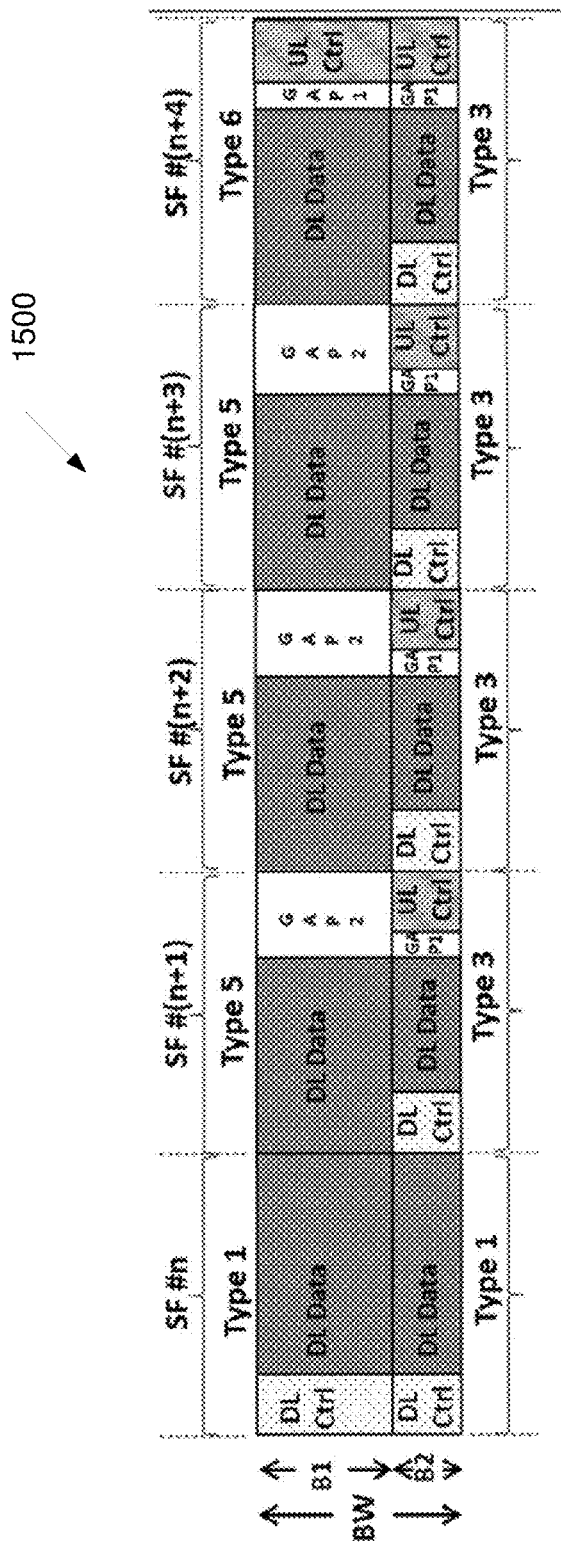
FIG. 15 illustrates a frame structure with 5 BBSFs per frame and a value FrameComposition=4 according to embodiments of the present disclosure.

FIG. 15 1500 illustrates a frame structure with 5 BBSFs per frame and a value FrameComposition=4 according to embodiments of the present disclosure. An embodiment of the frame structure with 5 BBSFs per frame and a value FrameComposition=4 shown in FIG. 15 1500 is for illustration only. One or more of the components illustrated in FIG. 15 1500 can be implemented in specialized circuitry configured to perform the noted functions or one or more of the components can be implemented by one or more processors executing instructions to perform the noted functions. Other embodiments are used without departing from the scope of the present disclosure.

The frame structures in FIG. 14 illustrates a combination of those in FIGS. 11 and 12, for the example case where the total bandwidth BW is partitioned into two portions denoted as B1 and B2.

In one of a frame of this type, the frame structure w.r.t the component BBSFs for the bandwidth B2 in FIG. 14 is the same as that (for the entire bandwidth) in FIG. 12. However, for the frame structure for the bandwidth B1, the $1^{st}$ BBSFs of Type 1 is replaced by a BBSF of Type 4, while BBSFs of Type 2 are replaced by those of Type 5. This replacement is to avoid a simultaneous UE transmission and reception.

In one instance of a frame of this type, each of the bandwidths B1 and B2 can function as a PHY slice, in that the DL control, DL data, SRS as well as Ack/Nacks from a UE may be indicated to be in one of the bandwidths. The Ack/Nack timing possibilities for each of the two bandwidths may follow the aforementioned embodiments (e.g., operation 1a, 1b and 2b).

Based on the aforementioned embodiments related to FIG. 11 and FIG. 12, this frame structure allows for simultaneous support for a latency-tolerant, high-throughput/eMBB and a URLL-type of service.

Figure 16:
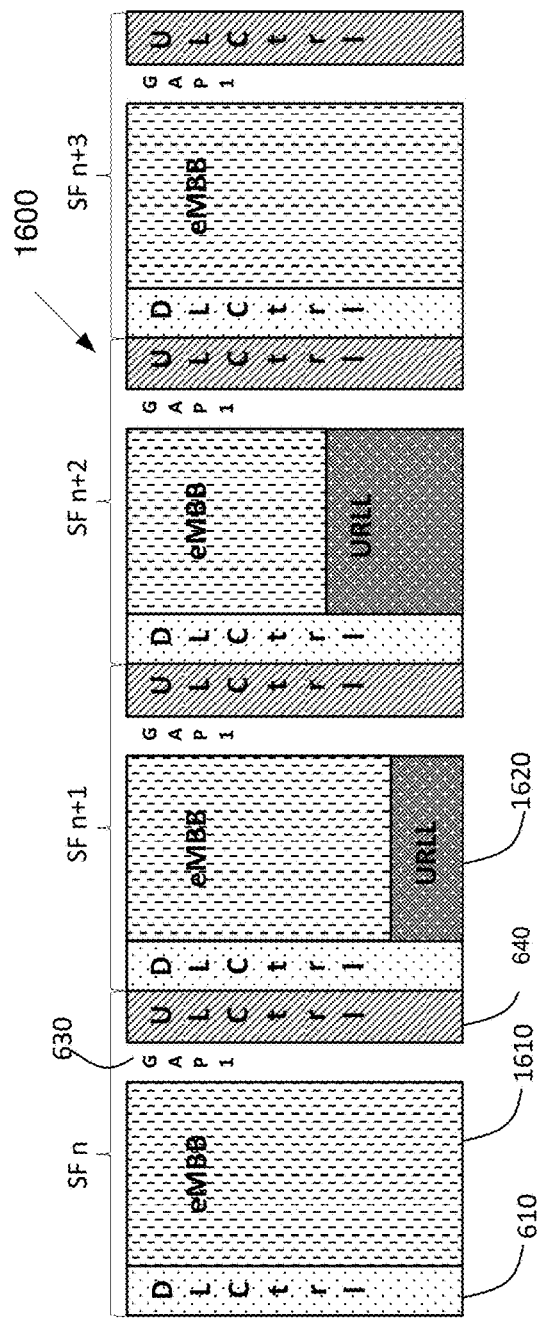
FIG. 16 illustrates a time division multiplexing (TDM) frame structure allowing dynamic frequency-selective scheduling of enhanced mobile broadband (eMBB) and ultra-reliable and low latency (URLL) with uplink control (UL Ctrl) always on according to embodiments of the present disclosure.

FIG. 16 1600 illustrates a time division multiplexing (TDM) frame structure allowing dynamic frequency-selective scheduling of enhanced mobile broadband (eMBB) and ultra-reliable and low latency (URLL) with uplink control (UL Ctrl) always on according to embodiments of the present disclosure. An embodiment of the time division multiplexing (TDM) frame structure allowing dynamic frequency-selective scheduling of enhanced mobile broadband (eMBB) and ultra-reliable and low latency (URLL) with uplink control (UL Ctrl) always on shown in FIG. 16 1600 is for illustration only. One or more of the components illustrated in FIG. 16 1600 can be implemented in specialized circuitry configured to perform the noted functions or one or more of the components can be implemented by one or more processors executing instructions to perform the noted functions. Other embodiments are used without departing from the scope of the present disclosure.

FIG. 16 illustrates a series of subframes, subframes n through n+3, multiplexing eMBB and URLL traffics. In the figure, eMBB 1610 and URLL 1620, respectively indicate either DL data 620 for eMBB and URLL traffics. In FIG. 16, all the subframes are of type 3 in FIG. 6. A type 3 subframe comprises DL ctrl 610 followed by DL data 620, which is subsequently followed by UL ctrl 640. DL ctrl 610 can schedule DL data 620 of different types, including eMBB 1610 and URLL 1620. It is assumed that 2 URLL traffics have arrived just before SF n+1 and n+2, and the network schedules them at SF n+1 and n+2. In this case, the URLL latency requirement is satisfied as in the following.

In some embodiments, A/N of the DL data 640 can be generated during the gap1 630. In such a case UL control 640 in SF x can contain A/N corresponding to DL data 640 in the same subframe x. As the URLL data transmission is acknowledged within each subframe, the URLL latency requirement is satisfied in those series of subframes in FIG. 16, as long as the subframe duration is less than 1 msec.

In some embodiments, A/N of the DL data 640 can be generated after a subframe has passed. In such a case UL control 640 in SF x can contain A/N corresponding to DL data 640 in the same subframe x+1. As the URLL data transmission is acknowledged in a subframe after, the URLL latency requirement is satisfied in those series of subframes in FIG. 16, as long as the subframe duration is less than 0.5 msec.

Hence, in this frame structure, DL data 620 in subframe x is acknowledged in UL ctrl 640 in subframe x+k (or A/N for DL data 620 in subframe x is configured to be transmitted in UL ctrl 640 in subframe x+k). A few methods to configure an integer k is devised. In one method, the integer k is constant, e.g., 0 or 1. In another method, the integer k is semi-statically configured per UE. In another method, the integer k is dynamically signaled in DL ctrl 610 in subframe x.

Figure 17:
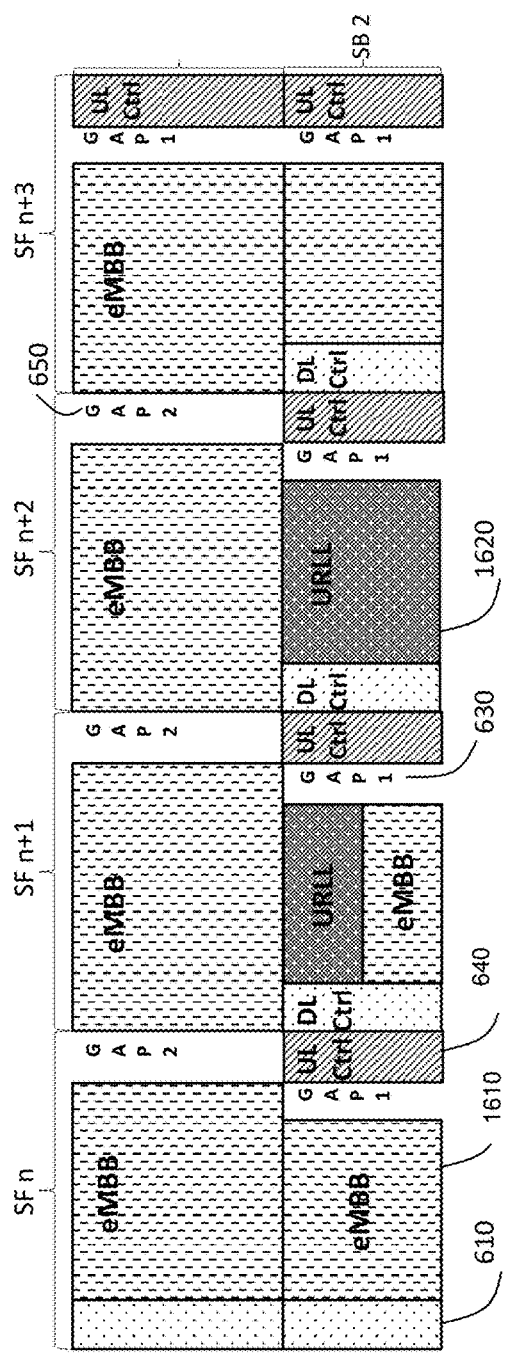
FIG. 17 illustrates a series of subframes including subframes n through n+3 for multiplexing eMBB and URLL traffics according to embodiments of the present disclosure.

FIG. 17 1700 illustrates a series of subframes including subframes n through n+3 for multiplexing eMBB and URLL traffics according to embodiments of the present disclosure. An embodiment of the series of subframes including subframes n through n+3 for multiplexing eMBB and URLL traffics shown in FIG. 17 1700 is for illustration only. One or more of the components illustrated in FIG. 17 1700 can be implemented in specialized circuitry configured to perform the noted functions or one or more of the components can be implemented by one or more processors executing instructions to perform the noted functions. Other embodiments are used without departing from the scope of the present disclosure.

In some embodiments of FDM frame structure of URLL and eMBB, URLL SB can accommodate both URLL and eMBB and eMBB SB can accommodate only eMBB.

FIG. 17 illustrates a series of subframes, subframes n through n+3, multiplexing eMBB and URLL traffics. In the figure, eMBB 1610 and URLL 1620 respectively indicate either DL data 220 for eMBB and URLL traffics. In FIG. 17, all the subframes are of type 3, type 4, type 5 or type 6 in FIG. 6. A type 3 subframe comprises DL ctrl 610 followed by DL data 620, which is subsequently followed by UL ctrl 640. DL ctrl 610 can schedule DL data 620 of different types, including eMBB 1610 and URLL 1620. A type 4 subframe comprises DL ctrl 610 followed by DL data 620, which is subsequently followed by gap2 650. A type 5 subframe comprises DL data 620 followed by gap2 650. A type 6 subframe comprises DL data 620 followed by gap1 630, which is subsequently followed by UL ctrl 640. Furthermore, in FIG. 17, the system bandwidth is partitioned into two, SB1 and SB2.

In SB1, subframe composition during SF n through SF n+3 is in a sequence of type 4, type 5, type 5 and type 6. It can be seen that this subframe composition in SB1 is more overhead efficient than the subframe composition in FIG. 17, because of lack of DL ctrl in SF n+1, n+2 and n+3. In SB1, the DL data 620 in subframe n can be acknowledged in SF n+3 at the earliest, and hence this subframe composition is more suitable for eMBB type of traffics, which do not have tight latency requirement.

In SB1, a DCI (PDCCH) transmitted in DL ctrl region 610 in subframe n may indicate subframe types of subsequent subframes, e.g., SF n through n+k; in the example embodiment related to FIG. 17, k=3. In one example, this DCI is configured to be decoded by a group of UEs, in which case a group UE-ID (or RNTI) may be used as a part of PDCCH generation. In another example, the subframe type indication is included in a DCI (PDCCH) transmitted for a unicast DL assignment. In SB1, a UE can be configured to receive either type 3 subframe or a series of subframes for eMBB traffic, in a dynamic signaling in PHY (e.g., in PDCCH), according to some embodiments of the current disclosure.

In some embodiments, the generation of A/N for eMBB data 1610 transmitted in SF n, n+1, n+2 and n+3 is completed during gap1 in SF n+3. In this case the UE is configured to generate A/N corresponding to the PDSCH transmitted in SFs n, n+1, n+2 and n+3, and is further configured to transmit the A/N on the UL Ctrl 640 in SF n+3.

In some embodiments, the generation of A/N for eMBB data 1610 transmitted in SF n, n+1, and n+2 is completed before the UL Ctrl 640 in SF n+3, but the generation of A/N the eMBB data transmitted in SF n+3 cannot be completed by then. In this case the UE is configured to generate A/N corresponding to the PDSCH transmitted in at least SFs n, n+1, and n+2; the UE can be further configured to generate A/N corresponding to the PDSCH transmitted in at least SFs n−1 if the UE has been configured to receive PDSCH in SF n−1. Then the UE is further configured to transmit the A/N on the UL Ctrl 640 in SF n+3.

In SB2, on the other hand, all the subframes during SF n through SF n+3 is of type 3; and hence the A/N can be transmitted in any of these subframes. Hence, a UE configured to receive DL ctrl 610 in SB2 can receive URLL traffic and the URLL latency requirement can be satisfied within SB2. In this figure, it is assumed that 2 URLL traffics have arrived just before SF n+1 and n+2, and the network schedules them at SF n+1 and n+2. In this case, the URLL latency requirement is satisfied.

In some embodiments, A/N of the DL data 260 can be generated during the gap1 630. In such a case UL control 640 in SF x can contain A/N corresponding to DL data 640 in the same subframe x. As the URLL data transmission is acknowledged within each subframe, the URLL latency requirement is satisfied in those series of subframes in SB2 in FIG. 17, as long as the subframe duration is less than 1 msec.

In some embodiments, A/N of the DL data 640 can be generated after a subframe has passed. In such a case UL control 640 in SF x can contain A/N corresponding to DL data 260 in the same subframe x+1. As the URLL data transmission is acknowledged in a subframe after, the URLL latency requirement is satisfied in those series of subframes in SB2 in FIG. 17, as long as the subframe duration is less than 0.5 msec.

SB2 can also be used for both eMBB and URLL traffics. In one such embodiment, a UE to receive eMBB traffic can be configured to receive DL ctrl 610 in both SB1 and SB2, so that the UE can receive DL data 620 in both SB1 and SB2. Another UE to receive URLL traffic only can be configured to receive DL ctrl 610 in SB2 only. To enable such a configuration, in some embodiments, a UE is semi-statically indicated by RRC of the subband(s) to receive DL ctrl. In each configured subbands to receive DL ctrl 610, the UE is configured to blindly search for a valid DL ctrl in DL ctrl 610 in each subframe.

Figure 18:
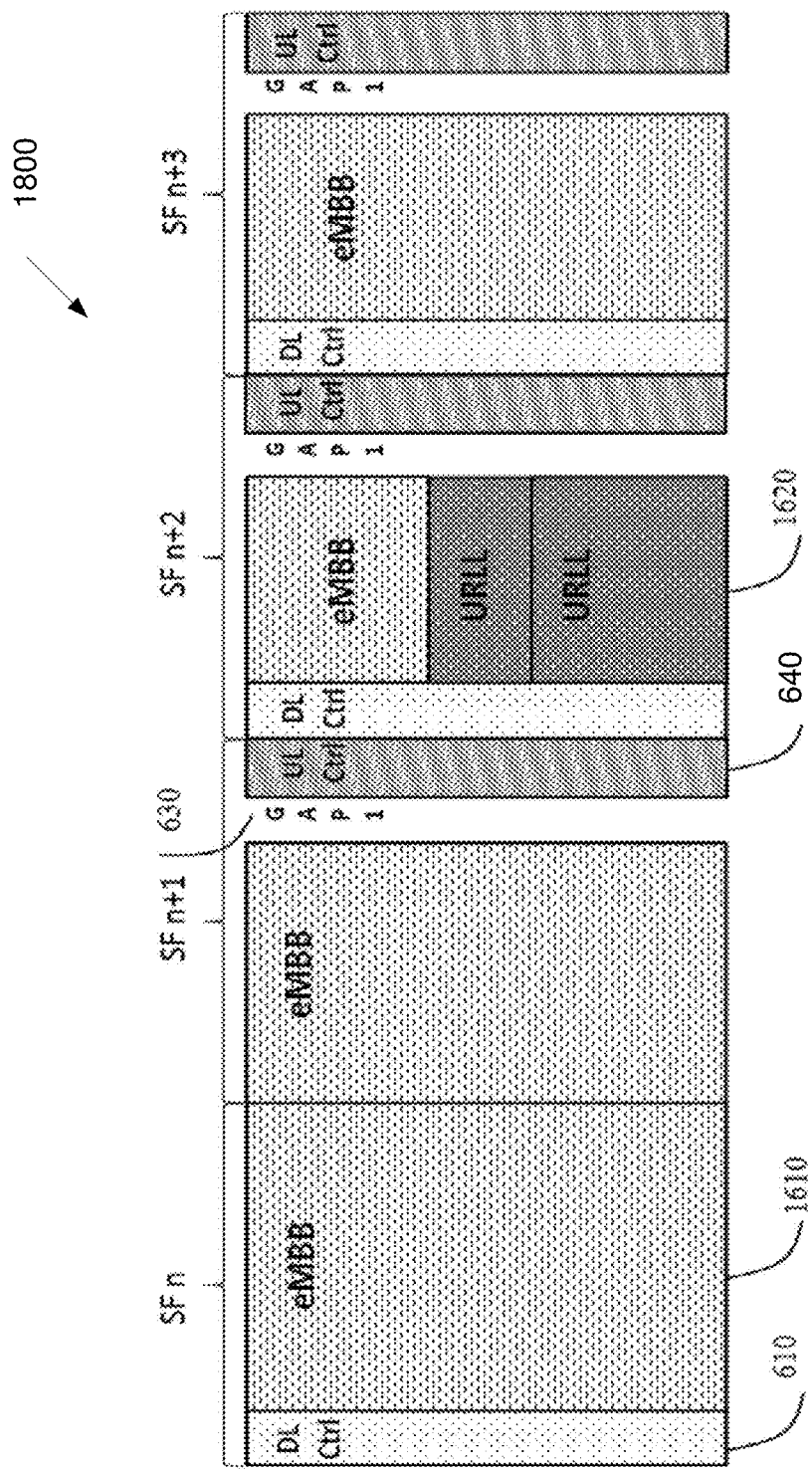
FIG. 18 illustrates a TDM frame structure allowing dynamic frequency-selective scheduling of eMBB and URLL with UL Ctrl on or off according to embodiments of the present disclosure.

FIG. 18 illustrates a TDM frame structure 1800 allowing dynamic frequency-selective scheduling of eMBB and URLL with UL Ctrl on or off according to embodiments of the present disclosure. An embodiment of the TDM frame structure 1800 allowing dynamic frequency-selective scheduling of eMBB and URLL with UL Ctrl on or off shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

FIG. 18 illustrates a series of subframes, subframes n through n+3, multiplexing eMBB and URLL traffics. In FIG. 18, eMBB 1610 and URLL 1620, respectively indicate either DL data 220 for eMBB and URLL traffics. In FIG. 18, all the subframes are of type 1, type 3, or type 6. A type 1 subframe comprises DL ctrl 610 followed by DL data 620. A type 3 subframe comprises DL ctrl 610 followed by DL data 620, which is subsequently followed by UL ctrl 640. DL ctrl 610 can schedule DL data 620 of different types, including eMBB 1610 and URLL 1620. A type 6 subframe comprises DL data 620 followed by gap1 630, which is subsequently followed by UL ctrl 640.

In some embodiments, a UE can be configured to receive PDSCH (or DL data 620) across up to y, e.g., two, subsequent subframes counting from the current subframe x in the assigned BW according to DL assignment in a single PDCCH (DCI) transmitted in DL Ctrl region 610 transmitted in the current subframe x. In one such example as illustrated in FIG. 18, in DL ctrl region 610 in subframe x=n, a UE is configured to receive DL data 620 across y=2 subframes, subframes n and n+1. In DL ctrl region 610 in subframe n+2, the UE is configured to receive DL data 620 in that subframe only. To enable this operation, in some embodiments, a UE receives an indication on the number of consecutive subframes that will transmit assigned PDSCH for the UE in a PDCCH (DCI) transmitted in DL Ctrl region 610 in subframe x. A UE can be configured to receive either type 3 subframe or a series of subframes for eMBB traffic, in a dynamic signaling in PHY (e.g., in PDCCH), according to some embodiments of the current disclosure.

In FIG. 18, it is assumed that 2 URLL traffics have arrived just before SFs n+1 and n+2, and the network schedules both in SF n+2, as subframe n+1 is already reserved for type 6 subframe which does not include DL Ctrl 620. In this case, the URLL latency requirement is satisfied as in the following. In some embodiments, A/N of the DL data 640 can be generated during the gap1 630. In such a case UL control 640 in SF x+2 can contain A/N corresponding to DL data 640 in subframes x+2. As the URLL data transmission is acknowledged within each subframe, the URLL latency requirement is satisfied for both URLL traffics in FIG. 18, as long as the subframe duration is less than 0.5 msec.

In some embodiments, A/N of the DL data 640 can be generated after a subframe has passed. In such a case UL control 640 in SF x+2 can contain A/N corresponding to DL data 640 in the same subframe x+3. As the URLL data transmission is acknowledged in a subframe after, the URLL latency requirement is satisfied in those series of subframes in FIG. 18, as long as the subframe duration is less than 0.33 msec, taking into account the queuing delay caused from using subframe type 6 in subframe n+1.

Figure 19:
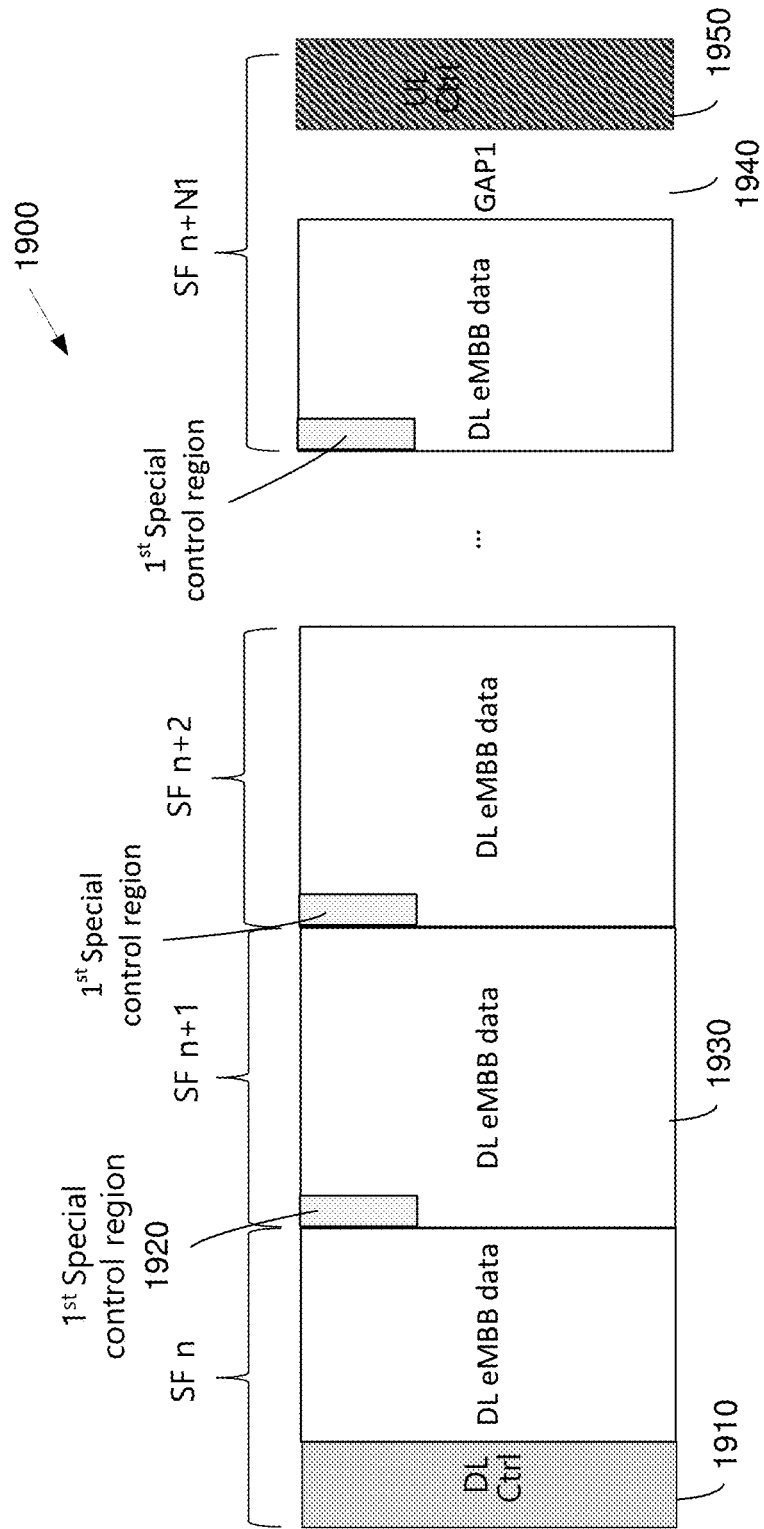
FIG. 19 illustrates a frame structure for dynamic URLL entry according to embodiments of the present disclosure.

FIG. 19 illustrates a frame structure 1900 for dynamic URLL entry according to embodiments of the present disclosure. An embodiment of the frame structure 1900 for dynamic URLL entry shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

FIG. 19 illustrates a frame structure that facilities flexible entry of URLL traffic. In some embodiment, UEs are configured with a frame structure comprising N consecutive SFs. The value of N is >=1. As illustrated in FIG. 19, SF n contains DL Ctrl 1910 (e.g., 610 as shown in FIG. 6) and DL data 1930 (e.g., 620 as shown in FIG. 6, eMBB). SF n+N−1 contains DL data 1930, Gap for DL and UL transmission GAP 1 1940 (e.g., 630 as shown in FIG. 6) and UL Ctrl 1950 (e.g., 640 as shown in FIG. 6). SF n+1~n+N−2 contains the DL data 1930. In some embodiment, the frame structure is configured by the DL Ctrl 1910 in SF n.

In some embodiment, a first multi-cast DCI (UE-group signaling) or a field in a DCI scheduling the eMBB traffic (unicast signaling) transmitted in the DL Ctrl 1910 also configures if a first special control region 1920 exists in each of those SFs. The multi-cast DCI may be decoded by all UEs, including the UEs expecting either eMBB service or URLL service or both. A special PDCCH is mapped on the first special control region 1920. The special PDCCH in a SF coveys a second multi-cast DCI to indicate the existence of URLL in the SF. In one example, the second multi-cast DCI comprises one 1-bit URLL_Flag field. URLL_Flag=1 indicates the existence of URLL region in the SF. URLL_Flag=0 indicates that there is no URLL region in one SF.

The second multi-cast DCI may be decoded by all UEs who have scheduled traffic in current subframe and also by any URLL UEs who has potential to receive URLL traffic in the current subframe. The location of first special control region 1920 could be configured by DL Ctrl 1910. The location of first special control region 1920 could also be configured by upper layer, for example, an RRC message. In one example, the first special control region 1920 is on the first OFDM symbol of a SF and the frequency location could be configured by the special DCI in DL Ctrl 1910, or one DCI scheduling eMBB or some RRC message. In one example, the time and frequency location can be determined based upon a static function of the physical cell ID.

In some embodiments, an eMBB PDSCH allocation DCI may use one transport block (TB) per SF. The DCI may also indicate one HARQ process number indication per SF. In some embodiment, the eMBB TB size per SF may be adapted based on the value information contained in a first special control region 1920. When the information in a first special control region 1920 indicates that a URLL region exist in a SF, the TB size of each eMBB allocation in the SF may be adapted accordingly. One method to adapt the TB size is that the TB size becomes S smaller than the originally scheduled TB size T in the SF. S could a constant, or a variable determined on the subsequent control signaling coming together with information contained in first special control region indicating that URLL region exists in the SF. In a special case, an eMBB TB could be adapted to 0, in which case an eMBB TB is not transmitted or received in the SF. In another method, the TB size stays to T without change.

Figure 20:
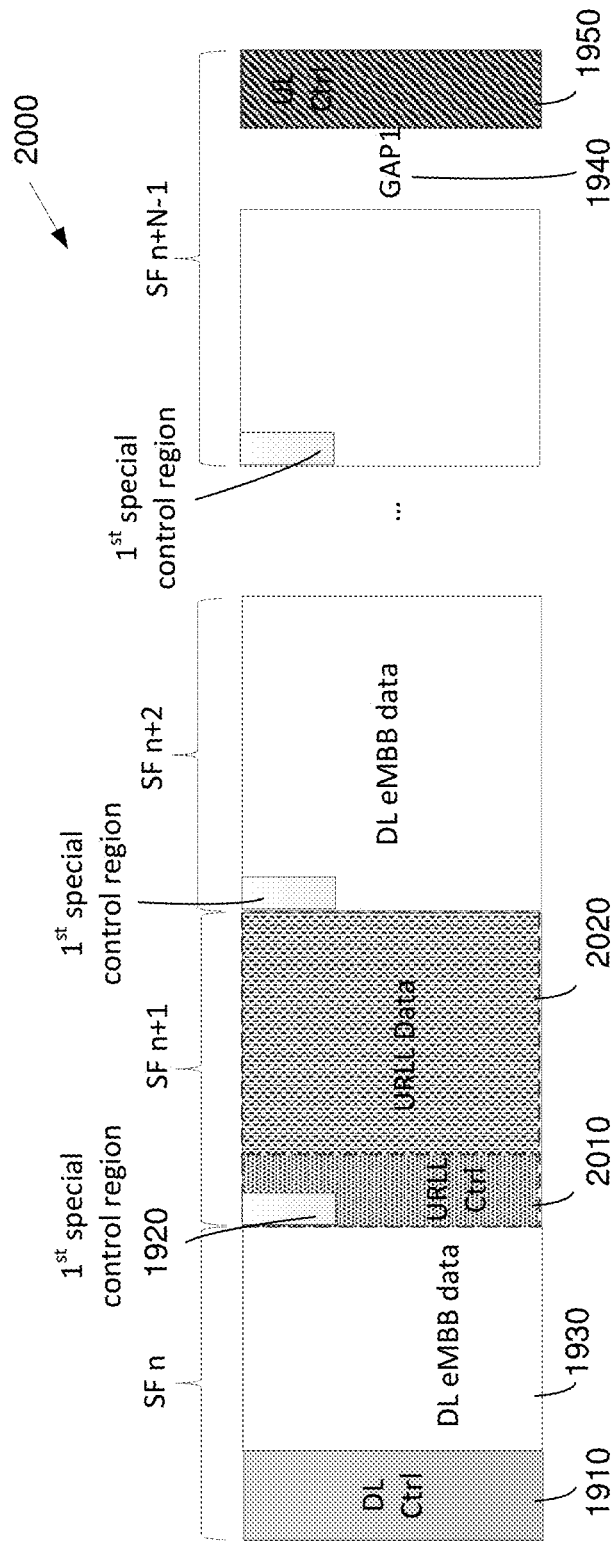
FIG. 20 illustrates another frame structure for dynamic URLL entry according to embodiments of the present disclosure.

FIG. 20 illustrates another frame structure 2000 for dynamic URLL entry according to embodiments of the present disclosure. An embodiment of the frame structure 2000 for dynamic URLL entry shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

In some embodiment, the URLL region pre-empts one whole SF when URLL region exists in one SF. As illustrated in FIG. 20, if the information in one first special control region 1920 indicates that URLL exists in a SF, for example, SF n+1, the URLL region comprising URLL ctrl 2010 and data 2020 occupies the whole SF. The first few OFDM symbols are configured to transmit the URLL Ctrl 2010. The URLL Ctrl 2010 schedules the URLL transmission in the following URLL data region 2020. The TB size scheduled for an eMBB UE scheduled in SF n+1 may be adjusted accordingly. For example, the TB size in SF n+1 is adjusted to 0, and the scheduled TB is not transmitted to the eMBB UE.

Figure 21:
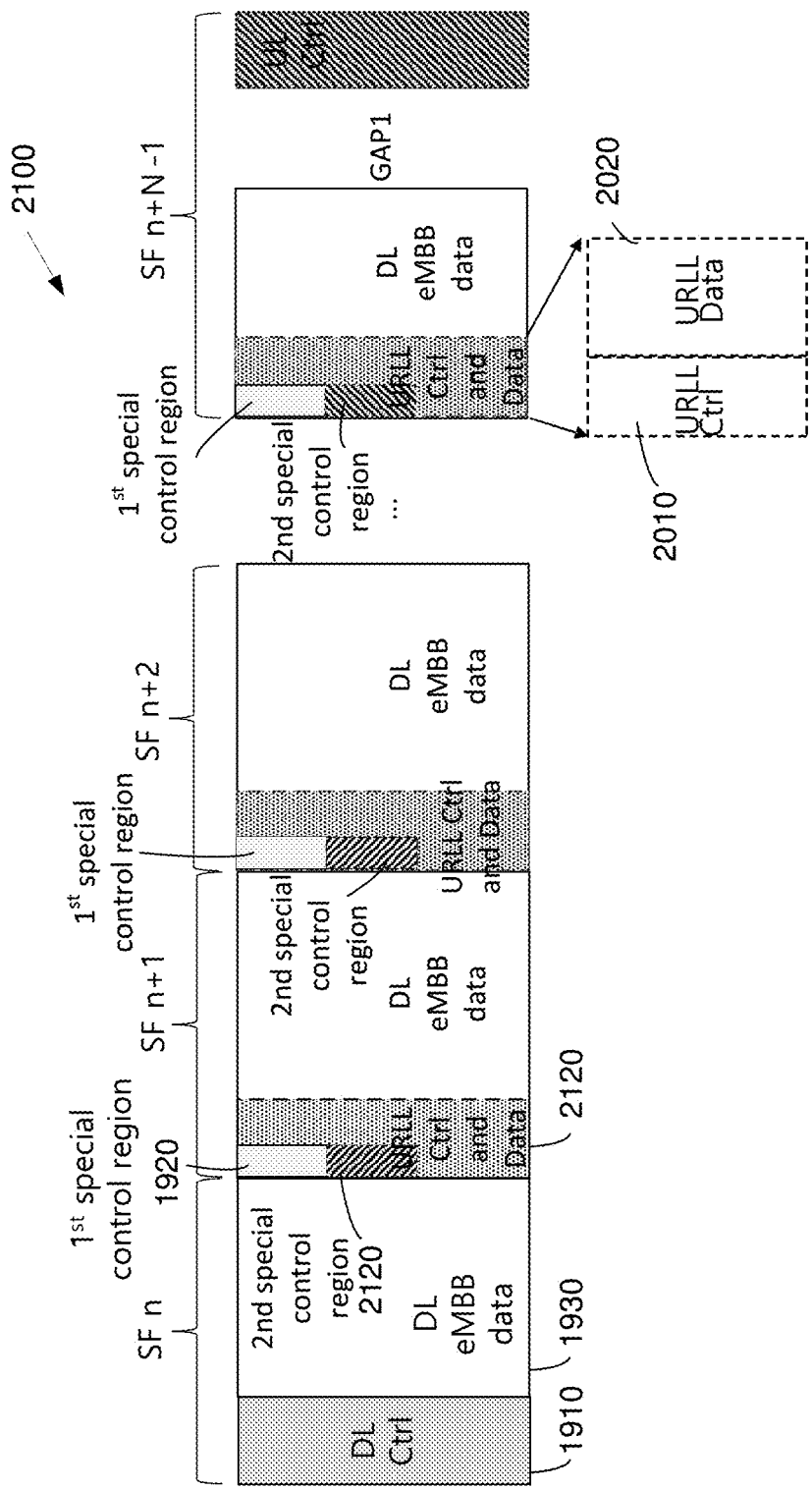
FIG. 21 illustrates a frame structure for dynamic URLL entry with time division multiplexing (TDM) according to embodiments of the present disclosure.

FIG. 21 illustrates a frame structure 2100 for dynamic URLL entry with time division multiplexing (TDM) according to embodiments of the present disclosure. An embodiment of the frame structure 2100 for dynamic URLL entry with TDM shown in FIG. 21 2100 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

A frame structure with URLL dynamic entry through TDM mode is illustrated in FIG. 21. In some embodiments, when the information, for example, URLL_Flag=1 in a first control region 1920 in SF n+m, a second special control region 2110 is configured in SF n+m. In the second special control region 2110, a special PDCCH is transmitted to indicate the number of OFDM symbols ($N_U$) for URLL region 2120 in SF n+m, comprising URLL Ctrl 2010 and data 2020. The time and frequency location of the second special control region 2110 could be configured by a DCI in DL Ctrl 1910 or some static configuration, for example, determined based on a function of the physical cell ID.

The first $N_U$ OFDM symbols are configured for URLL region 2120 and the rest of the OFDM symbols are configured for eMBB 1930. The eMBB UE scheduled in SF n+m may decode the value of $N_U$ and adapt the TB size accordingly. The TB size is reduced by S and the S is an increasing function of $N_U$. In the URLL region 2120, the first few OFDM symbols are URLL Ctrl 2010 and the following symbols in the URLL region 2120 are URLL data 2020. The URLL Ctrl 2010 schedules the URLL transmission in URLL data region 2020. The UEs expecting URLL traffic may decode the value of $N_U$. The UEs expecting URLL traffic may decode URLL Ctrl 2010 and then URLL data 2020 if being scheduled by URLL Ctrl.

Figure 22:
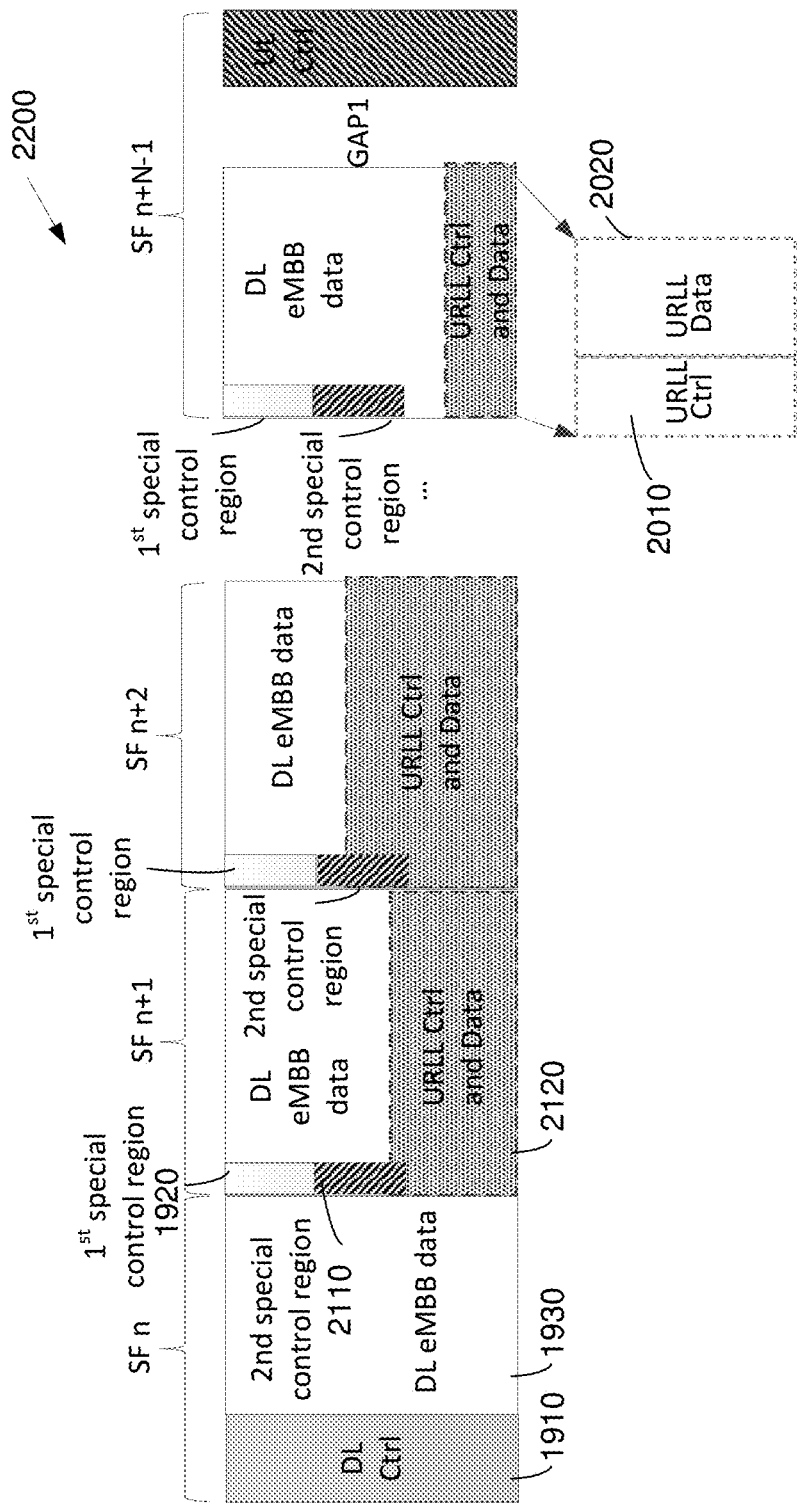
FIG. 22 illustrates another frame structure for dynamic URLL entry with time division multiplexing (TDM) according to embodiments of the present disclosure.

FIG. 22 illustrates another frame structure 2200 for dynamic URLL entry with time division multiplexing (TDM) according to embodiments of the present disclosure. An embodiment of the frame structure 2200 for dynamic URLL entry with TDM shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

A frame structure with URLL dynamic entry through FDM mode is illustrated in FIG. 22. In some embodiment, when the information, for example, URLL_Flag=1 in a first control region 1920 in SF n+m, a second control region 2110 is transmitted in SF n+m. In second control region, a special PDCCH is transmitted to indicate the number of frequency resource, for example, number of subcarriers, number of RBs or number of RBG ($N_U$) for URLL region in SF n+m. The time and frequency location of second control region

2110 could be configured by a DCI in DL Ctrl 1910 or some static configuration, for example, based on the Cell ID.

The URLL region 2120 comprises $N_U$ consecutive resources counting from one edge of the transmission bandwidth. The first $N_U$ frequency resources from one edge of bandwidth are for URLL region 2120 and the rest of the frequency resources are left for eMBB. The eMBB UE scheduled in SF n+m may decode the value of $N_U$ and adapt the TB size accordingly. For a UE whose eMBB allocation has no overlap with the URLL region 2120, the UE may keep the same TB size as originally scheduled. For a UE whose eMBB allocation is totally overlapped by the URLL region 2120, the UE may adapt the eMBB TB size for SF n+m to 0 and the UE is not configured to transmit/receive eMBB TB in SF n+m. For a UE whose eMBB allocation is partially overlapped with the URLL region 2120, the UE is configured to transmit/receive eMBB PDSCH only within the non-overlapped portion and the UE is configured to adapt the TB size by S accordingly. S is an increasing function of the size of overlapped portion of one UE.

The UE expecting URLL traffic may decode the value of $N_U$ from a DCI transmitted in the second control region 2110 and then decode the URLL region 2120. In URLL region 2120, the first few OFDM symbols are URLL Ctrl 2010 and the following symbols in URLL region are URLL data 2020. The URLL Ctrl 2010 schedules the URLL transmission in URLL data region 2020. The UEs expecting URLL traffic may decode the value of $N_U$. The UEs expecting URLL traffic may decode URLL Ctrl 2010 and then URLL data 2020 if being scheduled by URLL Ctrl 2010.

In some embodiments, the mode of URLL entry, TDM or FDM could be configured by higher layer through, for example, some RRC message.

Figure 23:
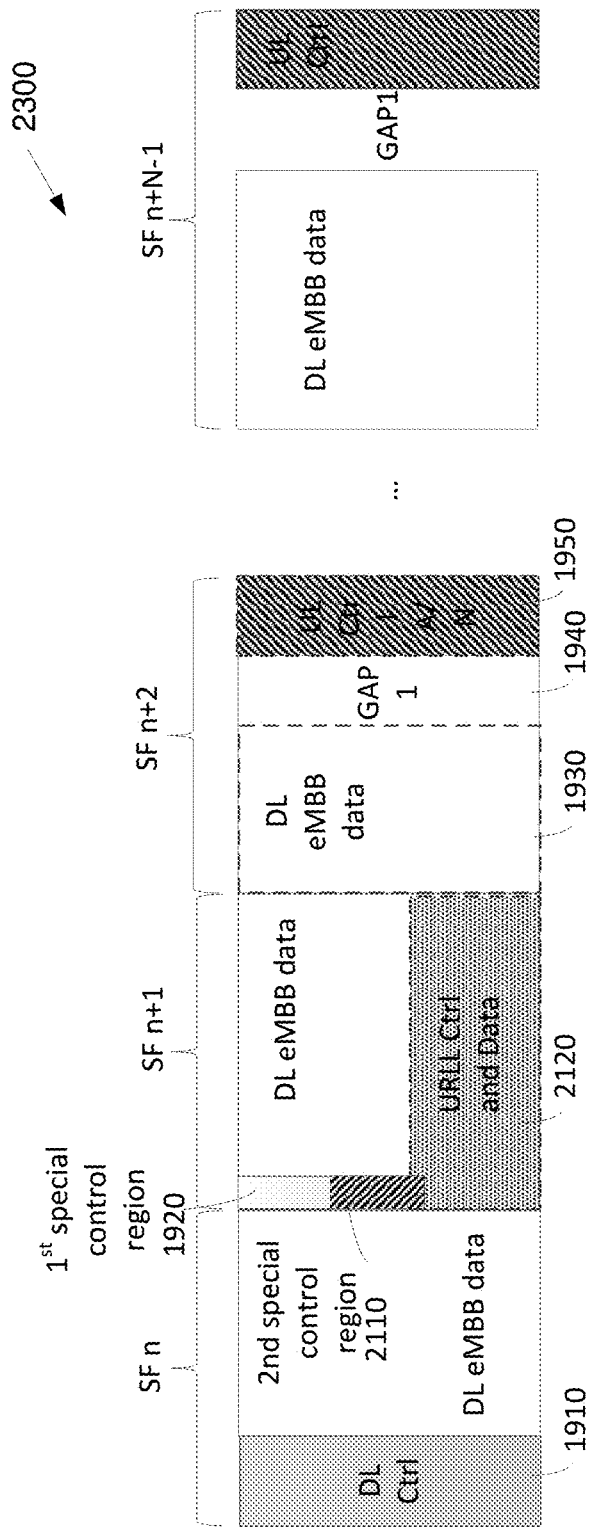
FIG. 23 illustrates yet another frame structure for dynamic URLL entry according to embodiments of the present disclosure.

FIG. 23 illustrates yet another frame structure 2300 for dynamic URLL entry according to embodiments of the present disclosure. An embodiment of the frame structure 2300 for dynamic URLL entry shown in FIG. 23 is for illustration only. One or more of the components illustrated in FIG. 23 2300 can be implemented in specialized circuitry configured to perform the noted functions or one or more of the components can be implemented by one or more processors executing instructions to perform the noted functions. Other embodiments are used without departing from the scope of the present disclosure.

In some embodiments, the type SF is adapted to facilitate fast A/N feedback for URLL traffic. As illustrated in FIG. 23, the type of SF n+2 is adapted based on the value of URLL_Flag in a first control region 1920 in SF n+1. The URLL_Flag=1 in first special control region 1920 in SF n+m indicates that a second special control region 2110 in SF n+m to indicate the size of URLL region 2120 in SF n+m, and a URLL region 2120 exists in SF n+m. The URLL_Flag=1 in first special control region 1920 in SF n+m also indicates SF type of SF n+m+m' is adapted to the SF type of DL Data 1930+GAP1 1940+UL Ctrl 1950, where m' is the HARQ A/N feedback delay requirement for URLL traffic. m' could be configured by DL Ctrl 1910 or higher layer through e.g., RRC.

The eMBB UE scheduled in SF n~n+N−1 may decode the first special control region 1920 in SF n+m and the UE may know the following based on the value of URLL_Flag: to decode second special control region 2110 and then know the size and location of URLL region 2120 in SF n+m; The SF new SF type of SF SF n+m+m'. The new SF type of SF n+m+m' comprises one DL data region 1930, one GAP1 1940 and one UL Ctrl region 1950. The eMBB UE originally scheduled in SF n+m and/or SF n+m+m' may adapt the TB size in each of these two SFs accordingly. The TB size in SF SF n+m+m' may be reduced by S2 and the value of S2 is function of the size of GAP1 1940 and the size of UL Ctrl in SF SF n+m+m'.

The UE expecting URLL traffic may decode first control region 1920. If URLL_Flag=1, it go further to decode the second special control region 2110 to obtain the size and location of URLL region 2120 in SF n+m. From decoding first special control region 1920, the URLL UE may also know the SF type of SF SF n+m+m.' The URLL Ctrl in URLL region in SF n+m schedules the URLL traffic in URLL data in URLL region in SF n+m. The URLL UE is configured to transmit HARQ A/N for the URLL transmission in SF n+m in UL Ctrl 1950 in SF SF n+m+m.' The transmission of HARQ A/N in SF n+m+m' could be configured by URLL Ctrl in SF n+m. The transmission of HARQ A/N in SF n+m+m' could be configured by higher layer, for example, through some RRC message.

Figure 24:
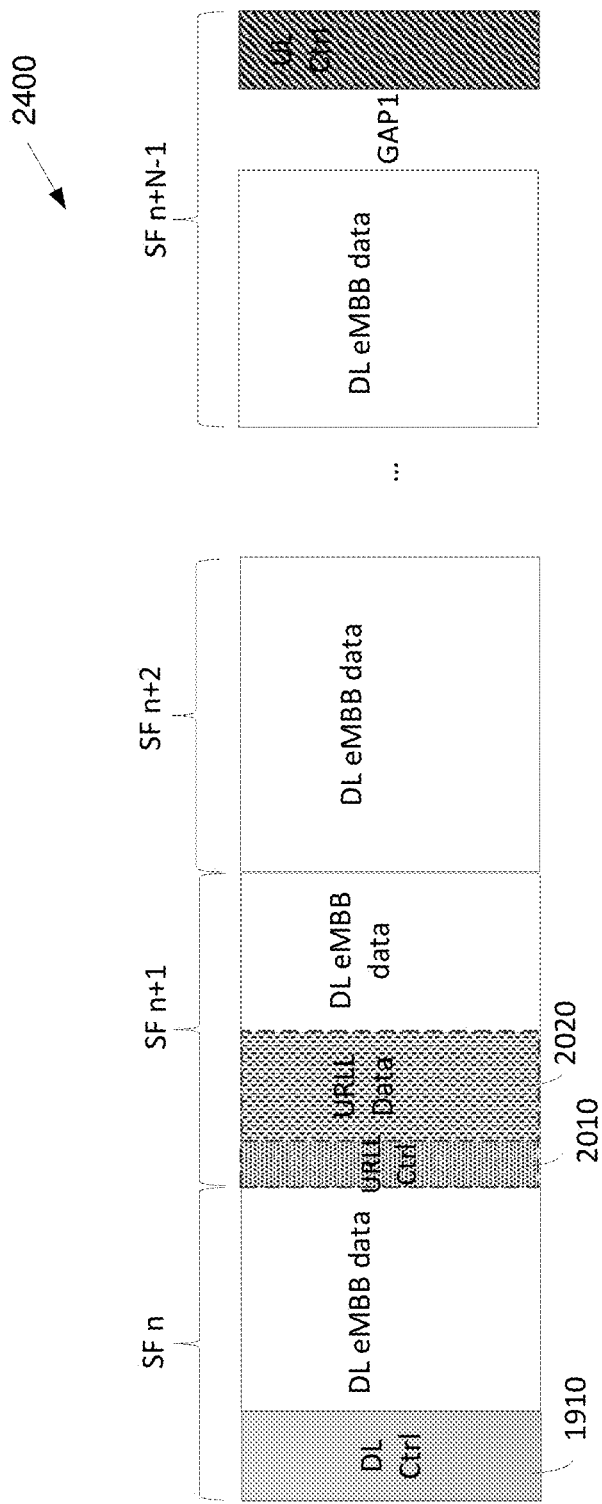
FIG. 24 illustrates yet another frame structure for dynamic URLL entry according to embodiments of the present disclosure.

FIG. 24 illustrates yet another frame structure 2400 for dynamic URLL entry according to embodiments of the present disclosure. An embodiment of the frame structure 2400 for dynamic URLL entry shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

In some embodiments, the eMBB UEs are indicated with time frequency resources (including subframe indices, PRB numbers, OFDM symbols) for URLL control regions 2010. For example, the first 2 OFDM symbols in SF n+1 are configured to be URLL control 2010. Then, the eMBB UE is further configured to detect energy in the URLL control 2010. If BS transmits DL control signaling in the URLL control region 2010 in SF n+m, the eMBB UE can detect the energy. When the eMBB detects energy, the TB size of eMBB for SF n+m is adapted to 0 and the eMBB UE originally scheduled to receive a TB in SF n+m is configured to suspend receiving the originally scheduled TB in SF n+m. The UE expecting URLL traffic may decode URLL Ctrl 2010 and then the URLL data 2020 if being scheduled by URLL Ctrl 2010. It is noted that the length of URLL data 2020 can span up to the subframe boundary of SF n+1. When the eMBB does not detect energy, the eMBB is configured to receive and decode the originally scheduled TB in subframe n+1. The expected TB size in subframe n+1 is adjusted taking into account the UL control region, according to some embodiments of the current disclosure.

In some embodiments, for example systems below 6 GHz, may use long SF length, for example, 0.5 ms or 1 ms. The above design could be still applied in such a system. However, due to the long SF length, it could be difficult to meet the delay requirement for URLL service when the URLL service delay requirement is tight.

Figure 25:
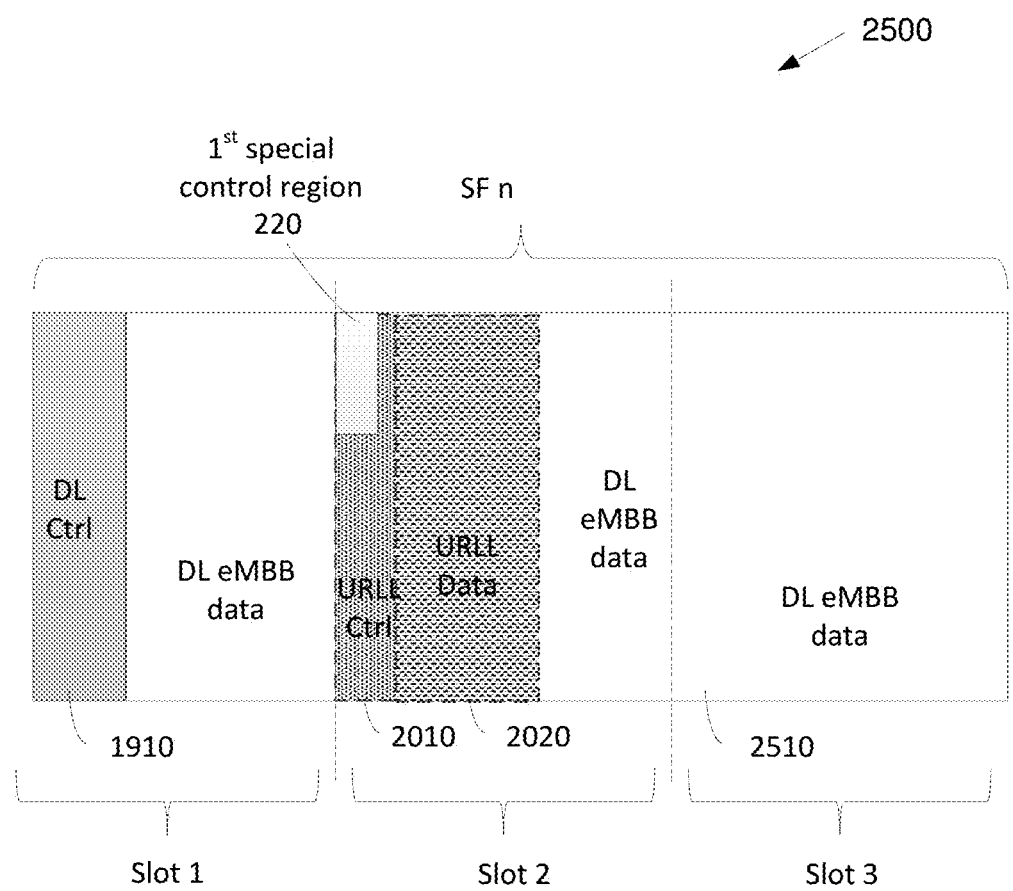
FIG. 25 illustrates a subframe structure for dynamic URLL entry according to embodiments of the present disclosure.

FIG. 25 illustrates a subframe structure 2500 for dynamic URLL entry according to embodiments of the present disclosure. An embodiment of the subframe structure 2500 for dynamic URLL entry shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

Figure 26:
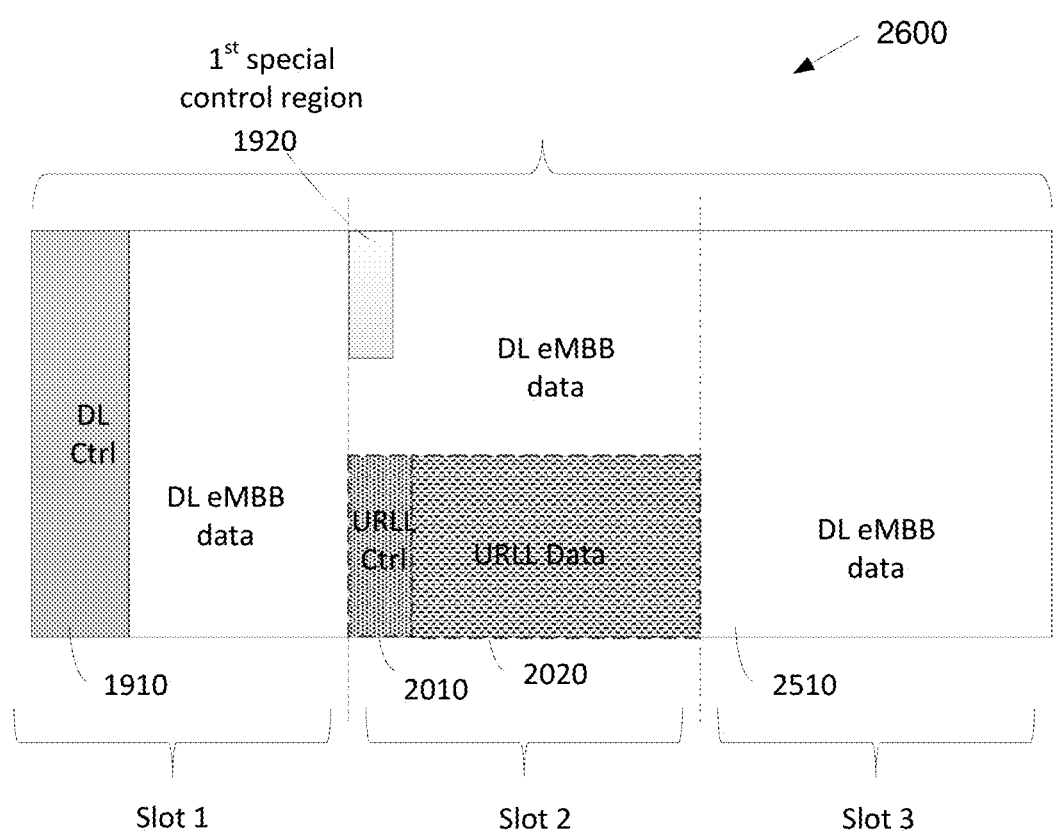
FIG. 26 illustrates another subframe structure for dynamic URLL entry according to embodiments of the present disclosure.

FIG. 26 illustrates another subframe structure 2600 for dynamic URLL entry according to embodiments of the present disclosure. An embodiment of the subframe structure 2600 for dynamic URLL entry shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

FIGS. 25 and 26 illustrate a subframe structure design that facilities URLL entry within one SF. As illustrated in FIGS. 25 and 26, one SF is divided into a positive integer number, L, slots. One slot 2510 comprises a few consecutive OFDM symbols. A typical example values for L=2, 3 and 4. In the examples of FIGS. 25 and 26, the value of L is 3. One could use a different value of L for a different scenario. The partition of slots, including the value of L and the number of OFDM symbols in each slot, could be indicated in a PDCCH in DL Ctrl 1910, or by a semi-static higher layer signaling (e.g., an RRC message). DL Ctrl 1910 schedules the eMBB traffic for SF n. In some embodiments, an eMBB PDSCH allocation DCI may use one transport block (TB) per slot. The URLL traffic transmitted in Slot 1 is scheduled by PDCCH in DL Ctrl 1910.

In some embodiments, a first multi-cast DCI (UE-grouping) signaling or a field in a DCI scheduling the eMBB traffic transmitted in the DL Ctrl 1910 indicates existence (and also location in some embodiments) of a first special control region 1920 in each slot in SF n other than slot 1. Alternatively, the existence and location of first special control region in each slot could be configured by higher layer (RRC) signaling. The information transmitted in the first special control region 1920 indicates the existence of URLL region (comprising URLL Ctrl 2010 and URLL data 2020) in one slot. If the information in the first special control region 1920 indicates that URLL region exist in one slot, some resources in one slot are configured for URLL region. One method to multiplex URLL region in one slot is TDM as illustrated in FIG. 25 and first $N_U$ OFDM symbols are configured as URLL region. Another method to multiplex URLL region in one slot is FDM as illustrated in FIG. 26 and first $N_U$ frequency resources (e.g., RBs) counting from one edge of the bandwidth are configured as URLL region. The size of URLL region in one slot could be configured by a multi-cast DCI DL Ctrl 1910 or could be configured by higher layer through e.g., RRC messages.

The eMBB UEs scheduled in SF n may decode the first special control region and know the size of URLL region 2010 and 2020 in each slot. The eMBB UE is configured to adapt the TB size for slot p where a URLL region is present. In the method of TDM, the TB size may be reduced by S, which is increasing function of URLL region size. In the method FDM, eMBB UE is configured to change TB size for slot P according to the eMBB allocation and URLL region location and the TB size may be reduced by S, which is a function of the size of the region overlapped by URLL region within one eMBB allocation.

In URLL region, the first few symbols are URLL Ctrl 2010 and the rest symbols are URLL data 2020. The URLL Ctrl 2010 schedules URLL traffic in URLL data 2020. The UE expecting URLL is configured to decode URLL Ctrl 2010 and then decode URLL data 2020.

Figure 27:
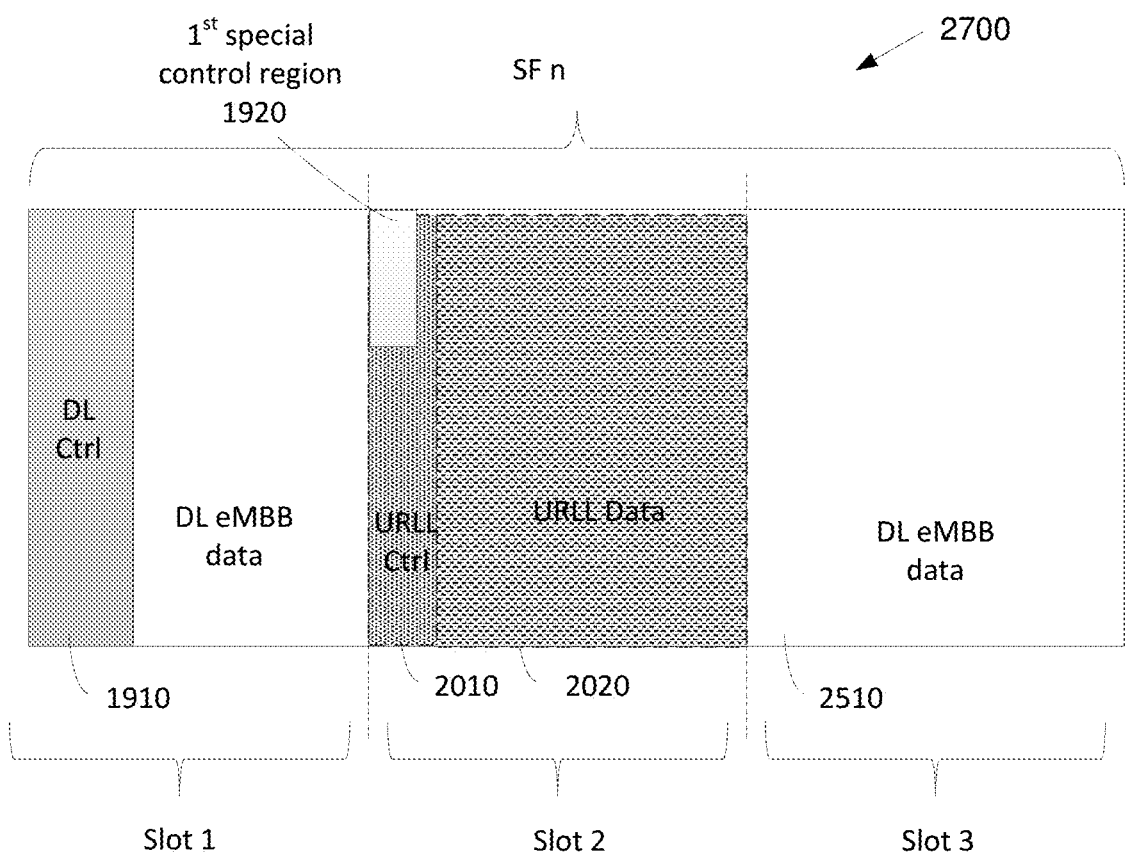
FIG. 27 illustrates a subframe structure for URLL dynamic entry with URLL region occupying one whole slot according to embodiments of the present disclosure.

FIG. 27 2700 illustrates a subframe structure for URLL dynamic entry with URLL region occupying one whole slot according to embodiments of the present disclosure. An embodiment of the subframe structure for URLL dynamic entry with URLL region occupying one whole slot shown in FIG. 27 2700 is for illustration only. One or more of the components illustrated in FIG. 27 2700 can be implemented in specialized circuitry configured to perform the noted functions or one or more of the components can be implemented by one or more processors executing instructions to perform the noted functions. Other embodiments are used without departing from the scope of the present disclosure.

In some embodiments, the URLL region occupies one whole slot when the information in first special control region indicates that URLL region exists in slot p, as illustrated in FIG. 27. In some of these embodiments, the eMBB UE scheduled to receive PDSCHs in subframe n is configured to receive one TB per slot in subframe n. When a whole slot is occupied by the URLL region, the eMBB UE is configured to adapt the TB size for slot p to 0 and no eMBB TB transmitted in slot p. In such embodiments, the eMBB UE scheduled to receive PDSCHs in subframe n is configured to receive one TB in subframe n. When a whole slot is occupied by the URLL region, the eMBB UE is configured to reduce the expected TB size for slot p by S, taking into account the loss of eMBB resource elements, according to some embodiments.

Figure 28:
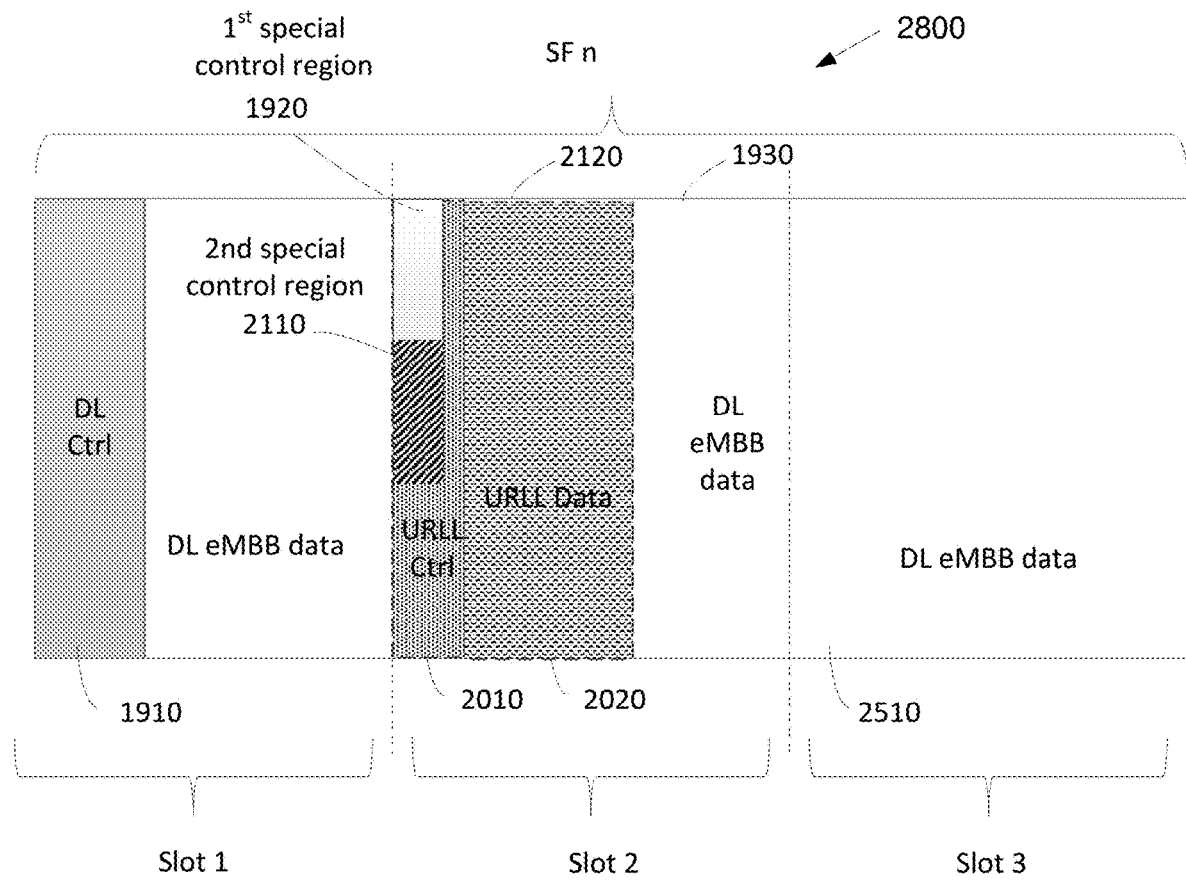
FIG. 28 illustrates yet another frame structure for dynamic URLL entry according to embodiments of the present disclosure.

FIG. 28 illustrates yet another frame structure 2800 for dynamic URLL entry according to embodiments of the present disclosure. An embodiment of the frame structure 2800 for dynamic URLL entry shown in FIG. 28 is for illustration only. One or more of the components illustrated in FIG. 28 can be implemented in specialized circuitry configured to perform the noted functions or one or more of the components can be implemented by one or more processors executing instructions to perform the noted functions. Other embodiments are used without departing from the scope of the present disclosure.

Figure 29:
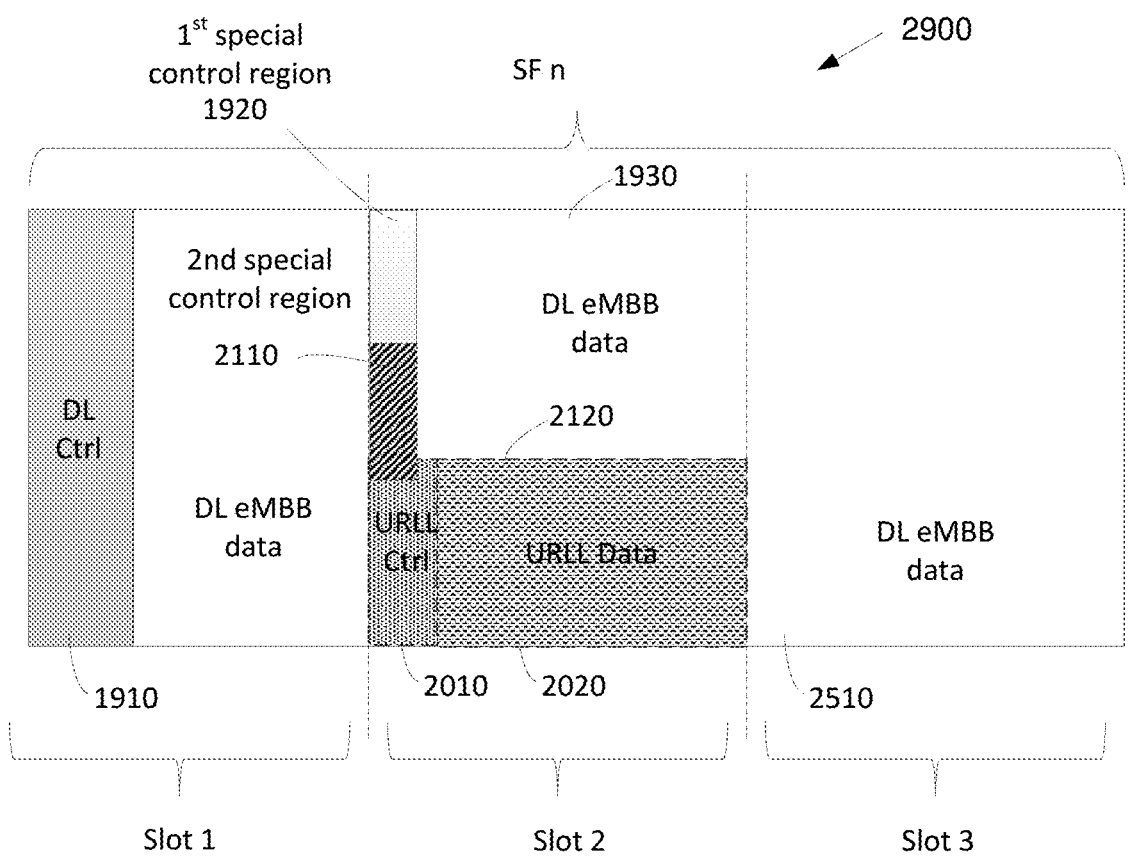
FIG. 29 illustrates yet another frame structure for dynamic URLL entry according to embodiments of the present disclosure.

FIG. 29 illustrates yet another frame structure 2900 for dynamic URLL entry according to embodiments of the present disclosure. An embodiment of the frame structure 2900 for dynamic URLL entry shown in FIG. 29 is for illustration only. One or more of the components illustrated in FIG. 29 can be implemented in specialized circuitry configured to perform the noted functions or one or more of the components can be implemented by one or more processors executing instructions to perform the noted functions. Other embodiments are used without departing from the scope of the present disclosure.

In some embodiments, a second special control region 2110 is transmitted in one slot to deliver the information of URLL region size in slot p, as illustrated in FIGS. 28 and 29. When the information, for example, URLL_Flag=1 in a first control region 1920 in the slot p, a second special control region 2110 is configured in slot p. In the second special control region 2110, a special PDCCH is transmitted to indicate the number of resources ($N_U$) for URLL region 2120 in slot p, comprising URLL Ctrl 2010 and data 2020. The time and frequency location of the second special control region 2010 (e.g., URLL control region, URLL control, URLL region, URLL ctrl) could be configured by a DCI in DL Ctrl 1910 or some semi-static configuration, for example, determined based on a function of the physical cell ID.

The $N_U$ is the number of resources in slot p is configured for URLL region. In the method of multiplexing URLL region through TDM as illustrated in FIG. 28, the first $N_U$ OFDM symbols are configured for URLL region 2120 and the rest of the OFDM symbols are configured for eMBB 1930. In the method of multiplexing URLL region through FDM as illustrated in FIG. 29, the first $N_U$ frequency resources (e.g., PRBs) counting from one edge of the bandwidth are configured to be URLL region 2120 and the rest of the frequency resources are eMBB 1930.

All the UEs including eMBB UEs scheduled in slot p and URLL UEs expecting URLL traffic in slot p are configured to decode the second special control region to obtain the size of URLL region 2120. The eMBB UEs are configured to adapt the TB size for slot p according to the decoding results of the second special control region. According to the decoding results of the second special control region, URLL UEs decode the URLL Ctrl 2010 and then decode URLL data 2020 in URLL region 2120 in slot p.

In some embodiments, a UE can be configured with one or more slice (service) configurations in the higher layer. For example, one UE is configured with two slice configuration, one for eMBB and another one is for URLL. When the UE is configured with more than one slice configurations, for each slice configuration, a separate MAC and a separate RRC are configured as illustrated in FIG. 10.

In some embodiments, a slice configuration may comprise at least some of: the operating point x for CQI index measurement; a PDSCH transport block with a combination of modulation scheme and TB size corresponding to the CQI index may be received with block error rate not exceeding x; the number of REs or REGs (resource-element groups) comprising a CCE (control channel element) for PDCCH; the number of REs comprising an REG for PDCCH; a DL transmission mode; and HARQ retransmission configuration and UL A/N channel format. One could apply different HARQ retransmission scheme to URLL and eMBB. For example, for URLL, there could be no HARQ retransmission.

In some embodiments, a UE can be configured with either a Class A or a Class B slice/service configuration, or both. The class A is for eMBB operation, and the class B is for URLL operation. Each slice configuration can have a separate MAC and RRC as illustrated in FIG. 10. Depending on which of Class A (eMBB) or Class B (URLL) slice/service configuration is configured, a few parameters are implicitly determined for UE /eNB implementations. Some examples of which are: the operating point x for CQI index measurement, wherein if Class A (eMBB) is configured, x is 0.1, and wherein if Class B (URLL) is configured, x is 0.0001 (in another example, 0.001; in another example, 0.01); the number of REs or REGs comprising a CCE for PDCCH, wherein if Class A (eMBB) is configured, a first number of REs (or REGs) comprises a CCE, wherein an example value for the first number is: 9 REGs (or 36 REs); and wherein if Class B (URLL) is configured, a second number of REs (or REGs) comprises a CCE. In such instances, an example value for the second number is 18 REGs (or 72 REs). In such instances, the second number is equal to an integer multiple of the first number, wherein examples of the integer are 2, 3, 4.

In some embodiments, a number of REs comprises an REG for PDCCH. In such embodiments, if Class A (eMBB) is configured, a first number of REs comprises an REG, wherein example values for the first number are 2, 4. In such embodiments, if Class B (URLL) is configured, a second number of REs comprises an REG, wherein example values for the second number are 4, 8. In such embodiments, thee second number is equal to an integer multiple of the first number, wherein examples of the integer are 2, 3, 4.

In some embodiments, subcarrier spacing is determined. In such embodiments, if Class A (eMBB) is configured, subcarrier spacing is y kHz, wherein an example value is 15.

In such embodiments, if Class B (URLL) is configured, subcarrier spacing is z kHz, wherein example values are 30, 45, 60, 75, etc.

In some embodiments, TTI length is determined. In such embodiments, if Class A (eMBB) is configured, TTI length is u msec, wherein an example value is 1. In such embodiments, if Class B (URLL) is configured, TTI length is v msec, wherein example values are 0.2, 0.5, and wherein u is equal to an integer multiple of v, wherein examples of the integer are 2, 3, 4, 5.

In some embodiments, number of OFDM symbols for PUCCH for A/N transmission is determined. In such embodiments, if Class A (eMBB) is configured, a PUCCH for A/N transmission comprises a first number of OFDM symbols, wherein an example value is the total number of OFDM symbols in a time slot. In such embodiments, if Class B (URLL) is configured, a PUCCH for A/N transmission comprises a second number of OFDM symbols, wherein an example value is the total number of OFDM symbols in a subframe (or a TTI).

In some embodiment, the configuration of URLL region 2120, including the existence, the size and the location information of URLL region 2120, is signaled by one or more than one of the following schemes: the URLL region 2120 is configured by DL Ctrl 1910 or higher layer (RRC) signaling, including the existence in one SF or in one slot, the size, the multiplexing method and the location; a special PDCCH including a DCI in the first special control region 1920 indicates the existence of URLL region 2120 in one SF or one slot. A DCI in the DL Ctrl 1910 or higher layer (RRC) signaling configures the size and the location of URLL region 2120 in one SF or one slot. In some embodiments, the multiplexing method (FDM, TDM, etc.) are also indicated by the higher-layer signaling; a special PDCCH including a DCI in the first special control region 1920 indicates the existence and the size of URLL region 2120 in one SF or one slot. The DL Ctrl 1910 or higher layer (RRC) signaling configures the method of multiplexing URLL region 2120 (TDM or FDM); and a special PDCCH including a DCI in the first special control region 1920 indicates the existence of the URLL region 2120 in one SF or one slot. Another special PDCCH in the second special control region 2110 indicates the size of URLL region 2120. A second special control region 2110 is transmitted when the PDCCH in a first special control region indicates that URLL region 2120 exists in one SF or one slot. The DL Ctrl 1910 or higher layer (RRC) signaling configures the multiplexing method of URLL region 2120.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method comprising:
    receiving:
        a first physical downlink shared channel (PDSCH) that provides a first transport block, and
        a second PDSCH that provides a second transport block;
    generating:
        first hybrid automatic response request acknowledgement (HARQ-ACK) information in response to reception of the first transport block, and
        second HARQ-ACK information in response to reception of the second transport block;
    multiplexing:
        the first HARQ-ACK information in a first physical uplink control channel (PUCCH), and
        the second HARQ-ACK information in a second PUCCH; and
    transmitting:
        the first PUCCH within a first time unit having a first duration, and
        the second PUCCH within a second time unit having a second duration,
    wherein the first duration is a multiple of the second duration by an integer that is larger than one.

2. The method of claim 1, wherein the first duration is specified in system operation.

3. The method of claim 1, further comprising:
    receiving, via radio resource control (RRC) signaling, a configuration for the second duration.

4. The method of claim 1, wherein a maximum number of receptions for the first transport block is different than a maximum number of receptions for the second transport block.

5. The method of claim 1, further comprising multiplexing:
    a first channel quality indicator (CQI) index, corresponding to a first block error rate (BLER) associated with the first transport block, in the first PUCCH, and
    a second CQI index, corresponding to a second BLER that is different from the first BLER and is associated with the second transport block, in the second PUCCH.

6. The method of claim 1, further comprising receiving:
    a first physical downlink control channel (PDCCH) that provides a first downlink control information (DCI) format, and
    a second PDCCH that provides a second DCI format,
    wherein:
        the first DCI format:
            schedules the first PDSCH reception, and
            includes a field with a value indicating an offset, in a number of first time units from an end of the first PDSCH reception, for the first PUCCH transmission, and
        the second DCI format:
            schedules the second PDSCH reception, and
            includes a field with a value indicating an offset, in a number of second time units from an end of the second PDSCH reception, for the second PUCCH transmission.

7. The method of claim 1, further comprising receiving a physical downlink control channel (PDCCH), wherein:
    the PDCCH provides a downlink control information (DCI) format,
    the DCI format includes a field indicating an entry to a table specified in system operation, and
    the entry to the table provides a signaling direction for symbols of the first time unit over a number of first time units.

8. A user equipment (UE) comprising:
    a receiver configured to receive:

a first physical downlink shared channel (PDSCH) that
provides a first transport block, and
a second PDSCH that provides a second transport
block;
a processor connected to the receiver, the processor configured to:
generate first hybrid automatic response request acknowledgement (HARQ-ACK) information in response to reception of the first transport block,
generate second HARQ-ACK information in response to reception of the second transport block;
multiplex the first HARQ-ACK information in a first physical uplink control channel (PUCCH), and
multiplex the second HARQ-ACK information in a second PUCCH; and
a transmitter operably connected to the processor, the transmitter configured to transmit:
the first PUCCH within a first time unit having a first duration, and
the second PUCCH within a second time unit having a second duration,
wherein the first duration is a multiple of the second duration by an integer that is larger than one.

9. The UE of claim 8, wherein the first duration is specified in system operation.

10. The UE of claim 8, wherein the receiver is further configured to receive, via radio resource control (RRC) signaling, a configuration for the second duration.

11. The UE of claim 8, wherein a maximum number of receptions for the first transport block is different than a maximum number of receptions for the second transport block.

12. The UE of claim 8, wherein the processor is further configured to multiplex:
a first channel quality indicator (CQI) index, corresponding to a first block error rate (BLER) associated with the first transport block, in the first PUCCH, and
a second CQI index, corresponding to a second BLER that is different from the first BLER and is associated with the second transport block, in the second PUCCH.

13. The UE of claim 8, wherein:
the receiver is further configured to receive:
a first physical downlink control channel (PDCCH) that provides a first downlink control information (DCI) format, and
a second PDCCH that provides a second DCI format,
the first DCI format:
schedules the first PDSCH reception, and
includes a field with a value indicating an offset, in a number of first time units from an end of the first PDSCH reception, for the first PUCCH transmission, and
the second DCI format:
schedules the second PDSCH reception, and
includes a field with a value indicating an offset, in a number of second time units from an end of the second PDSCH reception, for the second PUCCH transmission.

14. The UE of claim 8, wherein:
the receiver is further configured to receive a physical downlink control channel (PDCCH) that provides a downlink control information (DCI) format,
the DCI format includes a field indicating an entry to a table specified in system operation, and
the entry to the table provides a signaling direction for symbols of the first time unit over a number of first time units.

15. A base station comprising:
a transmitter configured to transmit:
a first physical downlink shared channel (PDSCH) that provides a first transport block, and
a second PDSCH that provides a second transport block;
a receiver configured to receive:
a first physical uplink control channel (PUCCH) within a first time unit having a first duration, and
a second PUCCH within a second time unit having a second duration, wherein the first duration is a multiple of the second duration by an integer that is larger than one; and
a processor operably connected to the receiver, the processor configured to de-multiplex:
first hybrid automatic response request acknowledgement (HARQ-ACK) information in response to transmission of the first transport block, from the first PUCCH reception, and
second HARQ-ACK information in response to transmission of the second transport block, from the second PUCCH reception.

16. The base station of claim 15, wherein the transmitter is further configured to transmit, via radio resource control (RRC) signaling, a configuration for the second duration.

17. The base station of claim 15, wherein a maximum number of transmissions for the first transport block is different than a maximum number of transmissions for the second transport block.

18. The base station of claim 15, wherein the processor is further configured to de-multiplex:
a first channel quality indicator (CQI) index, corresponding to a first block error rate (BLER) associated with the first transport block, from the first PUCCH, and
a second CQI index, corresponding to a second BLER that is different from the first BLER and is associated with the second transport block, from the second PUCCH.

19. The base station of claim 15, wherein:
the transmitter is further configured to transmit:
a first physical downlink control channel (PDCCH) that provides a first downlink control information (DCI) format, and
a second PDCCH that provides a second DCI format,
the first DCI format:
schedules the first PDSCH transmission, and
includes a field with a value indicating an offset, in a number of first time units from an end of the first PDSCH transmission, for the first PUCCH reception, and
the second DCI format:
schedules the second PDSCH transmission, and
includes a field with a value indicating an offset, in a number of second time units from an end of the second PDSCH transmission, for the second PUCCH reception.

20. The base station of claim 15, wherein:
the transmitter is further configured to transmit a physical downlink control channel (PDCCH) that provides a downlink control information (DCI) format,
the DCI format includes a field indicating an entry to a table specified in system operation, and
the entry to the table provides a signaling direction for symbols of the first time unit over a number of first time units.

* * * * *